United States Patent [19]

Kantner et al.

[11] Patent Number: 5,224,533
[45] Date of Patent: *Jul. 6, 1993

[54] METHOD OF FORMING METAL MATRIX COMPOSITE BODIES BY A SELF-GENERATED VACCUM PROCESS, AND PRODUCTS PRODUCED THEREFROM

[75] Inventors: Robert C. Kantner, Newark, Del.; Stanislav Antolin, Elkton, Md.; Ratnesh K. Dwivedi, Wilmington, Del.

[73] Assignee: Lanxide Technology Company, LP, Newark, Del.

[*] Notice: The portion of the term of this patent subsequent to Nov. 17, 2009 has been disclaimed.

[21] Appl. No.: 888,241

[22] Filed: May 22, 1992

Related U.S. Application Data

[63] Continuation of Ser. No. 381,523, Jul. 18, 1989, abandoned.

[51] Int. Cl.$^5$ .................. B22D 19/14; B22D 19/00
[52] U.S. Cl. ........................... 164/98; 164/108; 164/61
[58] Field of Search ............ 164/91, 97, 98, 100–105, 164/61

[56] References Cited

U.S. PATENT DOCUMENTS

| | | | |
|---|---|---|---|
| 918,069 | 4/1909 | Marius | 164/97 |
| 2,606,831 | 8/1952 | Koehring | 75/22 |
| 3,175,260 | 3/1965 | Bridwell | 164/97 |
| 3,364,976 | 1/1968 | Reding et al. | 164/63 |
| 3,367,398 | 2/1968 | Riley | 164/97 |
| 3,396,777 | 8/1968 | Reding | 164/97 |
| 3,529,655 | 9/1970 | Lawrence | 164/97 |
| 3,547,180 | 12/1970 | Cochran et al. | 164/61 |
| 3,718,441 | 2/1973 | Landingham | 29/182.1 |
| 3,853,635 | 10/1974 | Demendi | 164/97 |
| 3,864,154 | 2/1975 | Gazza et al. | 29/123 B |
| 3,867,177 | 2/1975 | Ott et al. | 117/51 |
| 3,970,136 | 7/1976 | Cannell et al. | 164/108 |
| 4,232,091 | 11/1980 | Grimshaw et al. | 428/472 |
| 4,739,817 | 4/1988 | Hamajima et al. | 164/97 |
| 4,802,524 | 2/1989 | Donomoto | 164/97 |
| 4,828,008 | 5/1989 | White | 164/66.1 |
| 4,871,008 | 10/1989 | Dwivedi | 164/100 |
| 4,889,177 | 12/1989 | Charbonnier | 164/97 |
| 4,932,099 | 6/1990 | Corwin | 164/97 |
| 4,935,055 | 6/1990 | Aghajanian | 164/66.1 |

FOREIGN PATENT DOCUMENTS

| | | |
|---|---|---|
| 45002 | 2/1982 | European Pat. Off. . |
| 94353 | 11/1983 | European Pat. Off. . |
| 115742 | 8/1984 | European Pat. Off. . |
| 291441 | 11/1988 | European Pat. Off. . |
| 0364963 | 4/1990 | European Pat. Off. . |
| 51-00551 | 1/1976 | Japan ............... 164/80 |
| 59-10462 | 1/1984 | Japan ............... 164/102 |
| 60-114532 | 6/1985 | Japan ............... 164/97 |
| 61-1464 | 1/1986 | Japan ............... 164/97 |
| 2156718 | 10/1985 | United Kingdom ... 164/102 |

Primary Examiner—Richard K. Seidel
Assistant Examiner—Rex E. Pelto
Attorney, Agent, or Firm—Mark G. Mortenson; Stanislav Antolin

[57] ABSTRACT

The present invention relates to a novel process for forming metal matrix composite bodies. Particularly, a suitable matrix metal, typically in a molten state, is in contact with a suitable filler material or preform in the presence of a suitable reactive atmosphere in a sealed impermeable container, at least at some point during the process, which permits a reaction to occur between the reactive atmosphere and the molten matrix metal and/or filler material or preform and/or impermeable container, thereby causing molten matrix metal to infiltrate the filler material or preform due to, at least in part, the creation of a self-generated vacuum. Such self-generated vacuum infiltration occurs without the application of any external pressure or vacuum.

62 Claims, 22 Drawing Sheets

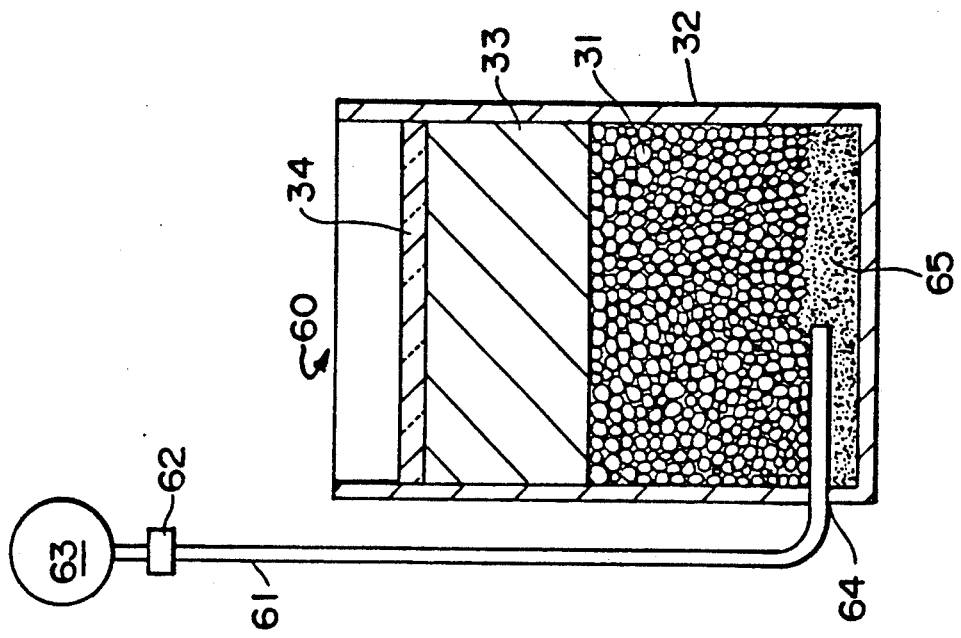
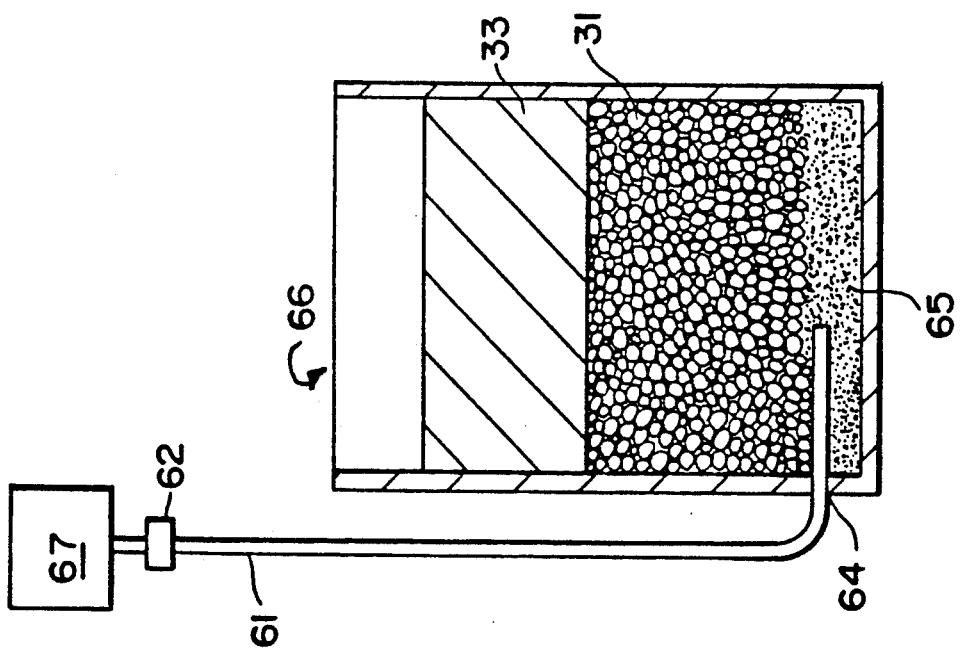

METHOD OF FORMING METAL MATRIX COMPOSITE BODIES BY A SELF-GENERATED VACCUM PROCESS, AND PRODUCTS PRODUCED THEREFROM

This is a continuation of copending application Ser. No. 07/381,523 filed on Jul. 18, 1989, now abandoned.

FIELD OF THE INVENTION

The present invention relates to forming metal matrix composite bodies. Particularly, a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

BACKGROUND OF THE INVENTION

Composite products comprising a matrix metal and a strengthening or reinforcing phase such as ceramic particulates, whiskers, fibers or the like show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents.

With powder metallurgy techniques, the metal in the form of a powder and the reinforcing material in the form of a powder, whiskers, chopped fibers, etc., are admixed and then either cold-pressed and sintered, or hot-pressed. The production of metal matrix composites by powder metallurgy techniques utilizing conventional processes imposes certain limitations with respect to the characteristics of the products attainable. The volume fraction of the ceramic phase in the composite is limited, in the case of particulates, typically to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136 granted Jul. 20, 1976 to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Other matrix metal-filler combinations are subject to the same considerations. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al. overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was ¼. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites.

In addition to application of pressure and wetting agents, it has been disclosed that an applied vacuum will aid the penetration of molten aluminum into a porous ceramic compact. For example, U.S. Pat. No. 3,718,441 granted Feb. 27, 1973 to R. L. Landingham reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154 granted Feb. 4, 1975 to G. E. Gazza et al. also shows the use of vacuum to achieve infiltration. The patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

A method for making composite materials containing a reinforcing material such as fibers, wires, powder, whiskers or the like is disclosed in European Patent Application Publication No. 045,002, published on Feb. 3, 1982 in the name of Donomoto. A composite material is produced by placing a porous reinforcing material (e.g., aligned fibers of alumina, carbon, or boron) that is non-reactive with the atmosphere and a molten metal (e.g., magnesium or aluminum) into a container having an open portion, blowing substantially pure oxygen into the container, then immersing the container in a pool of the molten metal whereby the molten metal infiltrates the interstices of the reinforcing material. The publication discloses that the molten metal reacts with the oxygen present in the container to form a solid oxidized form of the metal, creating a vacuum in the container which draws molten metal through the interstices of the reinforcing material and into the container. In an alternative embodiment, the publication discloses placing an oxygen getter element (e.g., magnesium) within the container to react with the oxygen in the container to create a vacuum which, with the assistance of 50 kg/cm² argon pressurization of the molten metal, draws the molten metal (e.g., aluminum) into the container filled with reinforcing material (e.g., aligned carbon fibers).

U.S. Pat. No. 3,867,177 granted Feb. 18, 1975 to J. J. Ott et al. discloses a method for impregnating a porous body with a metal by first contacting the body with an "activator metal", then immersing the body in a "filler metal". Specifically, a porous mat or compacted body of filler material is immersed in a molten activator metal for a time sufficient to completely fill the interstices of the body with molten activator metal by the method of the Reding et al. U.S. Pat. No. 3,364,976, discussed below. Subsequently, upon solidification of the activator metal, the composite body is entirely immersed in a second metal and maintained for a time sufficient to allow the second metal to replace the activator metal to a desired extent. The formed body is then allowed to cool. It is also possible to at least partially remove the filler metal from within the porous body and replace it with at least a third metal, again by partially or totally immersing the porous body in a molten replacement metal for a sufficient time to dissolve or diffuse a desired amount of replacement metal into the porous body. The resultant body may also contain intermetallics of the metals in the interstices between the filler material. Utilizing a multiple step process, including the use of an activator metal to form a composite having a desired composition, is costly in both time and money. Further, the limitations on processing based on, e.g., compatibility of metals (i.e., solubility, melting point, reactivity, etc.), limit the ability to tailor the characteristics of the material for a desired purpose.

U.S. Pat. No. 3,529,655 granted Sep. 22, 1970 to G. D. Lawrence, discloses a process for forming composites of magnesium or magnesium alloys and silicon carbide whiskers. Specifically, a mold having at least one opening to the atmosphere and containing silicon carbide whiskers in the interior volume of the mold is immersed in a bath of molten magnesium so that all openings in the mold are below the surface of the molten magnesium for a time sufficient for the magnesium to fill the remaining volume of the mold cavity. It is said that as the molten metal enters the mold cavity it reacts with the air contained therein to form small amounts of magnesium oxide and magnesium nitride, thereby forming a vacuum which draws additional molten metal into the cavity and between the whiskers of silicon carbide. The filled mold is subsequently removed from the molten magnesium bath and the magnesium in the mold is allowed to solidify.

U.S. Pat. No. 3,364,976 granted Jan. 23, 1968 to John N. Reding et al. discloses creating a self-generated vacuum in a body to enhance penetration of a molten metal into the body. Specifically, a body, e.g., a graphite or steel mold, or a porous refractory material, is entirely submerged in a molten metal, e.g., magnesium, magnesium alloy or aluminum alloy. In the case of a mold, the mold cavity, which is filled with a gas, e.g., air, that is reactive with the molten metal, communicates with the externally located molten metal through at least one orifice in the mold. When the mold is submerged in the melt, filling of the cavity occurs as a vacuum is produced from the reaction between the gas in the cavity and the molten metal. Particularly, the vacuum is a result of the formation of a solid oxidized form of the metal.

U.S. Pat. No. 3,396,777 granted Aug. 13, 1968 to John N. Reding, Jr., discloses creating a self-generated vacuum to enhance penetration of a molten metal into a body of filler material. Specifically, the patent discloses a steel or iron container open to the atmosphere at one end, the container containing a particulate porous solid, e.g., coke or iron, and being covered at the open end with a lid having perforations or through-holes smaller in diameter than the particle size of the porous solid filler. The container also houses an atmosphere, e.g., air, within the porosity of the solid filler which is at least partially reactive with the molten metal, e.g., magnesium, aluminum, etc. The lid of the container is immersed a sufficient distance below the surface of the molten metal to prevent air from entering the container and the lid is held below the surface for a sufficient time for the atmosphere in the container to react with the molten metal to form a solid product. The reaction between the atmosphere and the molten metal results in a low pressure or substantial vacuum within the container and porous solid that draws the molten metal into the container and the pores of the porous solid.

The Reding, Jr., process is somewhat related to the processes disclosed by European Publication No. 045,002, and U.S. Pat. Nos., 3,867,177, 3,529,655, and 3,364,976, all of which were discussed above herein. Specifically, this Reding, Jr., Patent provides a bath of molten metal into which a container, containing a filler material therein, is immersed deeply enough to induce a reaction between gas in the cavity and the molten metal and to seal the cavity with the molten metal. In another aspect of this Patent, the surface of the molten bath of matrix metal, which may be subject to oxidation in the molten state when in contact with the ambient air, is covered with a protective layer or flux. The flux is swept aside when the container is introduced to the molten metal, but contaminants from the flux may nevertheless be incorporated into the bath of molten matrix metal and/or into the container and porous solid material to be infiltrated. Such contamination, even at very low levels, may be detrimental to the formation of the vacuum in the container, as well as to the physical properties of the resultant composite. Further, when the container is removed from the bath of molten matrix metal and excess matrix metal is drained from the container, loss of matrix metal from the infiltrated body can occur due to gravitational forces.

Accordingly, there has been a long felt need for a simple and reliable process for producing metal matrix composites that does not rely upon the use of externally applied pressure or vacuum, damaging wetting agents or the use of a pool of molten matrix metal, with their attendant disadvantages as noted above. In addition, there has been a long felt need for a process that minimizes the final machining operations needed to produce a metal matrix composite body. The present invention satisfies these and other needs by providing a process involving a self-generated vacuum for infiltrating a material (e.g., a ceramic material), which can be formed into a preform, with a molten matrix metal (e.g., aluminum, magnesium, bronze, copper, cast iron, etc.) in the presence of a reactive atmosphere (e.g., air, nitrogen, oxygen, etc.) under normal atmospheric pressures.

DISCUSSION OF RELATED COMMONLY-OWNED PATENS AND PATENT APPLICATIONS

A novel method of forming a metal matrix composite by infiltration of a permeable mass of filler contained in a ceramic matrix composite mold is disclosed in Commonly Owned U.S. patent application Ser. No. 142,385, filed Jan. 11, 1988, by Dwivedi et al., and entitled "Method of Making Metal Matrix Composites", now allowed in the United States. According to the method of the Dwivedi et al. invention, a mold is formed by the directed oxidation of a molten precursor metal or parent metal with an oxidant to develop or grow a polycrystalline oxidation reaction product which embeds at least a portion of a preform comprised of a suitable filler (referred to as a "first filler"). The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patent application describes a method for the production of a metal matrix composite body, which may be bonded to a ceramic matrix composite body, and the novel bodies which are produced therefrom. The entire disclosure of this commonly owned patent application is expressly incorporated herein by reference.

SUMMARY OF THE INVENTION

In the method of the present invention, a novel metal matrix composite body is produced by a novel self-generated vacuum technique, wherein a molten matrix metal infiltrates a permeable mass of filler material or preform which is disposed in an impermeable container. Specifically, a molten matrix metal and a reactive atmosphere are both in communication with the permeable mass, at least at some point during the process, and upon contact between the reactive atmosphere and the matrix metal and/or filler material or preform and/or impermeable container, a vacuum is generated, resulting in the molten matrix metal infiltrating the filler material or preform.

In a first preferred embodiment, a reaction system is provided comprising an impermeable container, and a filler material contained therein, contacting a molten matrix metal in the presence of a reactive atmosphere and a sealing means for sealing the reaction system from the ambient atmosphere. The reactive atmosphere reacts, either partially or substantially completely, with the molten matrix metal and/or the filler material and/or the impermeable container to form a reaction product which may create a vacuum, thereby drawing molten matrix metal at least partially into the filler material. The reaction involving the reactive atmosphere and molten matrix metal and/or filler material and/or impermeable container may continue for a time sufficient to allow molten matrix metal to either partially or substantially completely infiltrate the filler material or preform. An extrinsic sealing means for sealing the reaction system, having a composition different from the matrix metal, may be provided.

In another preferred embodiment, the matrix metal may react with the ambient atmosphere to form an intrinsic chemical sealing means, having a composition different from the matrix metal, which seals the reaction system from the ambient atmosphere.

In a further embodiment of the invention, rather than providing an extrinsic sealing means for sealing the reaction system, an intrinsic physical seal may be formed by the matrix metal wetting the impermeable container, thus sealing the reaction system from the ambient atmosphere. Further, it may be possible to incorporate alloying additives into the matrix metal which facilitate wetting of the impermeable container by the matrix metal, thus sealing the reaction system from the ambient atmosphere.

In another preferred embodiment, the filler material may react, at least partially, with the reactive atmosphere to create a vacuum which draws molten matrix metal into the filler material or preform. Moreover, additives may be incorporated into the filler material which may react, either partially or substantially completely, with the reactive atmosphere to create a vacuum, as well as enhance the properties of the resultant body. Furthermore, in addition to or instead of the filler material and the matrix metal, the impermeable container may at least partially react with the reactive atmosphere to generate a vacuum.

DEFINITIONS

As used in the present specification and the appended claims, the terms below are defined as follows:

"Alloy Side", as used herein, refers to that side of a metal matrix composite which initially contacted molten matrix metal before that molten metal infiltrated the permeable mass of filler material or preform.

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ambient Atmosphere", as used herein, refers to the atmosphere outside the filler material or preform and the impermeable container. It may have substantially the same constituents as the reactive atmosphere, or it may have different constituents.

"Barrier" or "barrier means", as used herein, in conjunction with metal matrix composite bodies, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are either wettable or non-wettable by the migrating molten matrix metal under the process conditions employed, so long as wetting of the barrier means does not proceed substantially beyond the surface of the barrier material (i.e., surface wetting). A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product.

"Bronze", as used herein, means and includes a copper rich alloy, which may include iron, tin, zinc, aluminum, silicon, beryllium, magnesium and/or lead. Specific bronze alloys include those alloys in which the proportion of copper is about 90% by weight, the proportion of silicon is about 6% by weight, and the proportion of iron is about 3% by weight.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Cast Iron", as used herein, refers to the family of cast ferrous alloys wherein the proportion of carbon is at least about 2% by weight.

"Copper", as used herein, refers to the commercial grades of the substantially pure metal, e.g., 99% by weight copper with varying amounts of impurities contained therein. Moreover, it also refers to metals which are alloys or intermetallics which do not fall within the definition of bronze, and which contain copper as the major constituent therein.

"Filler", as used herein, is intended to include either single constituents or mixtures of constituents which are substantially non-reactive with and/or of limited solubility in the matrix metal and may be single or multiphase. Fillers may be provided in a wide variety of forms, such as powders, flakes, platelets, microspheres, whiskers, bubbles, etc., and may be packed either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Impermeable Container", as used herein, means a container which may house or contain a reactive atmosphere and a filler material (or preform) and/or molten matrix metal and/or a sealing means under the process conditions, and which is sufficiently impermeable to the transport of gaseous or vapor species through the container, such that a pressure difference between the ambient atmosphere and the reactive atmosphere can be established.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity without any external means of support prior to being infiltrated by the matrix metal. The mass should be sufficiently porous to permit infiltration of the matrix metal. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reaction System", as used herein, refers to that combination of materials which exhibit self-generated vacuum infiltration of a molten matrix metal into a filler material or preform. A reaction system comprises at least an impermeable container having therein a permeable mass of filler material or preform, a reactive atmosphere and a matrix metal.

"Reactive Atmosphere", as used herein, means an atmosphere which may react with the matrix metal and/or filler material (or preform) and/or impermeable container to form a self-generated vacuum, thereby causing molten matrix metal to infiltrate into the filler material (or preform) upon formation of the self-generated vacuum.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Seal" or "Sealing Means", as used herein, refers to a gas-impermeable seal under the process conditions, whether formed independent of (e.g., an extrinsic seal) or formed by the reaction system (e.g., an intrinsic seal), which isolates the ambient atmosphere from the reactive atmosphere. The seal or sealing means may have a composition different from that of the matrix metal.

"Seal Facilitator", as used herein, is a material that facilitates formation of a seal upon reaction of the matrix metal with the ambient atmosphere and/or the impermeable container and/or the filler material or preform. The material may be added to the matrix metal, and the presence of the seal facilitator in the matrix metal may enhance the properties of the resultant composite body.

"Wetting Enhancer", as used herein, refers to any material, which when added to the matrix metal and/or the filler material or preform, enhances the wetting (e.g., reduces surface tension of molten matrix metal) of the filler material or preform by the molten matrix metal. The presence of the wetting enhancer may also enhance the properties of the resultant metal matrix composite body by, for example, enhancing bonding between the matrix metal and the filler material.

BRIEF DESCRIPTION OF THE FIGURES

The following figures are provided to assist in understanding the invention, but are not intended to limit the scope of the invention. Similar reference numerals have been used wherever possible in each of the Figures to denote like components, wherein:

FIGS. 12A and 12B are cross-sectional views of lay-ups used according to Example 10;

DETAILED DESCRIPTION OF THE INVENTION AND PREFERRED EMBODIMENTS

Figure 1A:
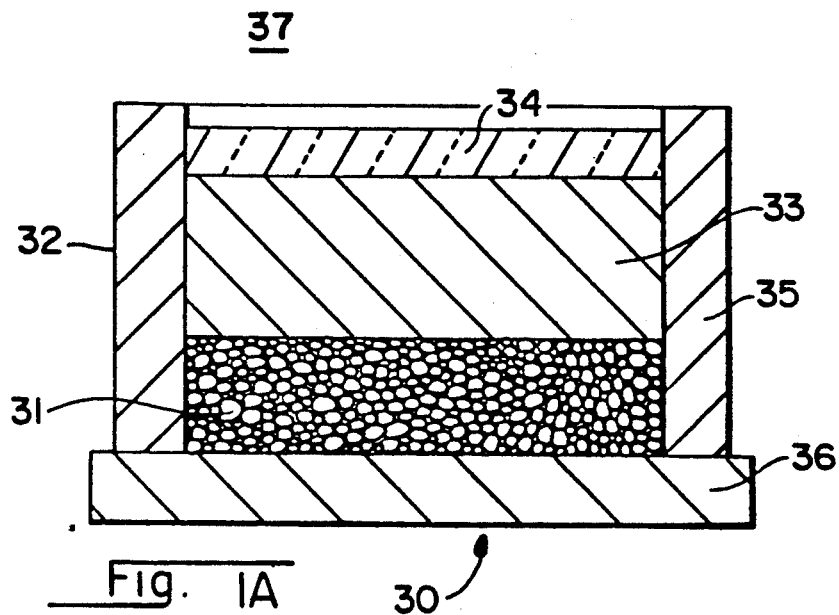
FIG. 1A is a schematic cross-sectional view of a typical lay-up according to the method of the present invention which utilizes an extrinsic sealing means.

With reference to FIG. 1A, a typical lay-up 30 for forming a metal matrix composite by a self-generated vacuum technique according to the present invention is illustrated. Specifically, a filler material or preform 31, which may be of any suitable material as discussed in more detail below, is disposed in an impermeable container 32 which is capable of housing a molten matrix metal 33 and a reactive atmosphere. For example, the filler material 31 may be contacted with a reactive atmosphere (e.g., that atmosphere which exists within the porosity of the filler material or preform) for a time sufficient to allow the reactive atmosphere to permeate either partially or substantially completely the filler material 31 in the impermeable container 32. The matrix metal 33, in either a molten form or a solid ingot form, is then placed in contact with the filler material 31. As described in more detail below in a preferred embodiment, an extrinsic seal or sealing means 34 may be provided, for example, on the surface of the matrix metal 33, to isolate the reactive atmosphere from the ambient atmosphere 37. The sealing means, whether extrinsic or intrinsic, may or may not function as a sealing means at room temperature, but should function as a sealing means under the process conditions (e.g., at or above the melting point of the matrix metal). The lay-up 30 is subsequently placed into a furnace, which is either at room temperature or has been preheated to about the process temperature. Under the process conditions, the furnace operates at a temperature above the melting point of the matrix metal to permit infiltration of molten matrix metal into the filler material or preform by the formation of a self-generated vacuum.

Figure 2:
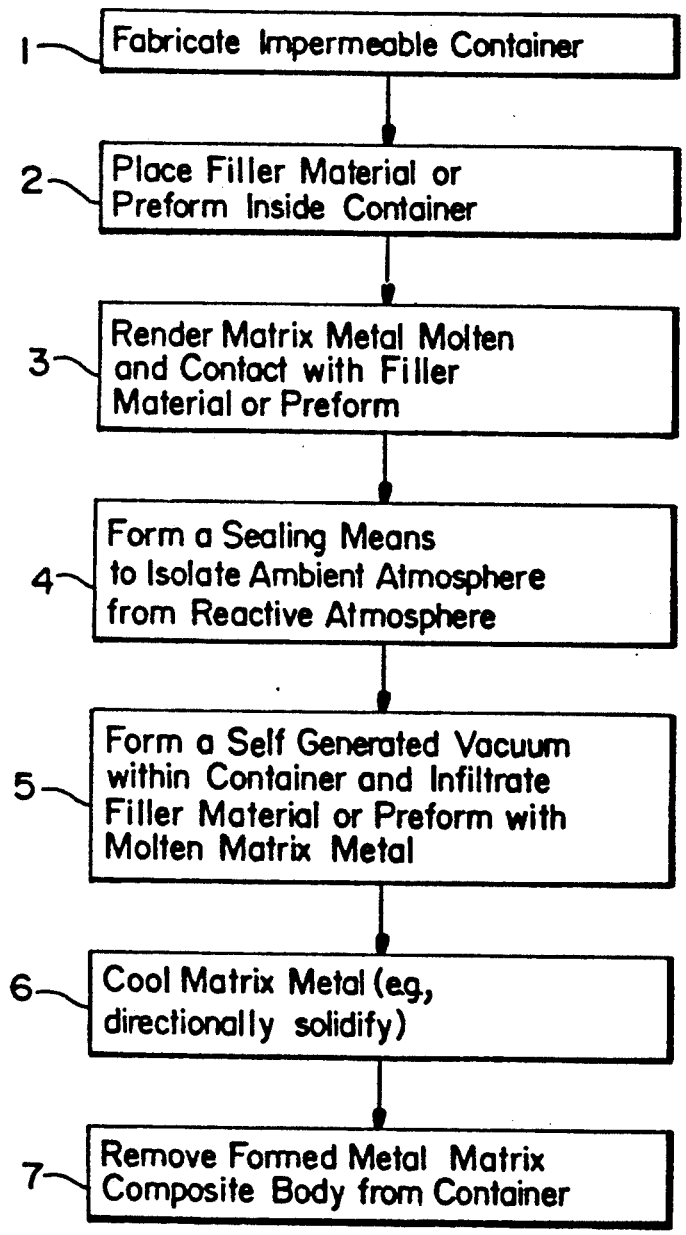
FIG. 2 is a simplified flowchart of the method of the present invention applied to a standard lay-up.

Referring to FIG. 2, there is shown a simplified flow-chart of process steps for carrying out the method of the present invention. In step (1), a suitable impermeable container can be fabricated or otherwise obtained that has the appropriate properties described in more detail below. For example, a simple open-topped steel (e.g., stainless steel) cylinder is suitable as a mold. The steel container may then optionally be lined with GRAFOIL® graphite tape (GRAFOIL® is a registered trademark of Union Carbide) to facilitate removal of the metal matrix composite body which is to be formed in the container. As described in more detail below, other materials, such as $B_2O_3$ dusted inside the container, or tin which is added to the matrix metal, can also be used to facilitate release of the metal matrix composite body from the container or mold. The container can then be loaded with a desired quantity of a suitable filler material or preform which, optionally, can be at least partially covered with another layer of GRAFOIL® tape. That layer of graphite tape facilitates separation of the metal matrix composite body from any carcass of matrix metal remaining after infiltration of the filler material.

A quantity of molten matrix metal, e.g., aluminum, bronze, copper, cast iron, magnesium, etc., can then be poured into the container. The container could be at room temperature or it could be preheated to any suitable temperature. Moreover, matrix metal could initially be provided as solid ingots of matrix metal and thereafter heated to render the ingots molten. An appropriate sealing means (described below in greater detail) selected from the group consisting of an extrinsic sealing means and an intrinsic sealing means can then be formed. For example, if it was desired to form an extrinsic seal, an extrinsic sealing means, such as a glass (e.g., $B_2O_3$) frit, can be applied to the surface of the pool of molten matrix metal in the container. The frit then melts, typically covering the surface of the pool, but, as described in more detail below, full coverage is not required. After contacting molten matrix metal with a filler material or preform and sealing the matrix metal and/or filler material from the ambient atmosphere by an extrinsic sealing means, if needed, the container is set in a suitable furnace, which may be preheated to the processing temperature, for a suitable amount of time to permit infiltration to occur. The processing temperature of the furnace may be different for different matrix metals (for example, about 950° C. for some aluminum alloys and about 1100° C. for some bronze alloys are desirable). The appropriate processing temperature will vary depending on the melting point and other characteristics of the matrix metal, as well as specific characteristics of components in the reaction system and the sealing means. After a suitable amount of time at temperature in the furnace, a vacuum will be created (described below in greater detail) within the filler material or preform, thereby permitting molten matrix metal to infiltrate the filler material or preform. The container can then be removed from the furnace and cooled, for example, by placing it on a chill plate to directionally solidify the matrix metal. The metal matrix composite can then be removed in any convenient manner from the container and separated from the carcass of matrix metal, if any.

It will be appreciated that the foregoing descriptions of FIGS. 1A and 2 are simply to highlight salient features of the present invention. Further details of the steps in the process and of the characteristics of the materials which can be used in the process are set forth below.

Without wishing to be bound by any particular theory or explanation, it is believed that when a suitable matrix metal, typically in a molten state, contacts a suitable filler material or preform in the presence of a suitable reactive atmosphere in an impermeable container, a reaction may occur between the reactive atmosphere and the molten matrix metal and/or filler material or preform and/or impermeable container that results in a reaction product (e.g., a solid, liquid or vapor) which occupies a lesser volume than the initial volume occupied by the reacting components. When the reactive atmosphere is isolated from the ambient atmosphere, a vacuum may be created in the permeable filler material or preform which draws molten matrix metal into the void spaces of the filler material. Continued reaction between the reactive atmosphere and the molten matrix metal and/or filler material or preform and/or impermeable container may result in the matrix metal infiltrating the filler material or preform as additional vacuum is generated. The reaction may be continued for a time sufficient to permit molten matrix metal to infiltrate, either partially or substantially completely, the mass of filler material or preform. The filler material or preform should be sufficiently permeable to allow the reactive atmosphere to permeate, at least partially, the mass of filler material or preform.

This application discusses various matrix metals which at some point during the formation of a metal matrix composite are contacted with a reactive atmosphere. Thus various references will be made to particular matrix metal/reactive atmosphere combinations or systems which exhibit self-generated vacuum formation. Specifically, self-generated vacuum behavior has been observed in the aluminum/air system; the aluminum/oxygen system; the aluminum/nitrogen system; the bronze/air system; the bronze/nitrogen system; the copper/air system; the copper/nitrogen system and the cast iron/air system. However, it will be understood that matrix metal/reactive atmosphere systems other than those specifically discussed in this application may behave in a similar manner.

In order to practice the self-generated vacuum technique of the present invention, it is necessary for the reactive atmosphere to be physically isolated from the ambient atmosphere such that the reduced pressure of the reactive atmosphere which exists during infiltration will not be significantly adversely affected by any gas being transported from the ambient atmosphere. An impermeable container that can be utilized in the method of the present invention may be a container of any size, shape and/or composition which may or may not be nonreactive with the matrix metal and/or reactive atmosphere and that is impermeable to the ambient atmosphere under the process conditions. Specifically, the impermeable container may comprise any material (e.g., ceramic, metal, glass, polymer, etc.) which can survive the process conditions such that it maintains its size and shape and which prevents or sufficiently inhibits transport of the ambient atmosphere through the container. By utilizing a container which is sufficiently impermeable to transport of atmosphere through the container, it is possible to form a self-generated vacuum within the container. Further, depending on the particular reaction system used, an impermeable container which is at least partially reactive with the reactive atmosphere and/or matrix metal and/or filler material may be used to create or assist in creating a self-generated vacuum within the container.

The characteristics of a suitable impermeable container are freedom from pores, cracks or reducible oxides each of which may adversely interfere with the development or maintenance of a self-generated vacuum. It will thus be appreciated that a wide variety of materials can be used to form impermeable containers. For example, molded or cast alumina or silicon carbide can be used, as well as metals having limited or low solubility in the matrix metal, e.g., stainless steel for aluminum, copper and bronze matrix metals.

In addition, otherwise unsuitable materials such as porous materials (e.g., ceramic bodies) can be rendered impermeable by formation of a suitable coating on at least a portion thereof. Such impermeable coatings may be any of a wide variety of glazes and gels suitable for bonding to and sealing such porous materials. Furthermore, a suitable impermeable coating may be liquid at process temperatures, in which case the coating material should be sufficiently stable to remain impermeable under the self-generated vacuum, for example, by viscously adhering to the container or the filler material or preform. Suitable coating materials include glassy materials (e.g., $B_2O_3$) chlorides, carbonates, etc., provided that the pore-size of the filler or preform is small enough that the coating can effectively block the pores to form an impermeable coating.

The matrix metal used in the method of the present invention may be any matrix metal which, when molten under the process conditions, infiltrates the filler material or preform upon the creation of a vacuum within the filler material. For example, the matrix metal may be any metal, or constituent within the metal, which reacts with the reactive atmosphere under the process conditions, either partially or substantially completely, thereby causing the molten matrix metal to infiltrate the filler material or preform due to, at least in part, the creation of a vacuum therein. Further, depending on the system utilized, the matrix metal may be either partially or substantially non-reactive with the reactive atmosphere, and a vacuum may be created due to a reaction of the reactive atmosphere with, optionally, one or more other components of the reaction system, thereby permitting the matrix metal to infiltrate the filler material.

In a preferred embodiment, the matrix metal may be alloyed with a wetting enhancer to facilitate the wetting capability of the matrix metal, thus, for example, facilitating the formation of a bond between the matrix metal and the filler, reducing porosity in the formed metal matrix composite, reducing the amount of time necessary for complete infiltration, etc. Moreover, a material which comprises a wetting enhancer may also act as a seal facilitator, as described below, to assist in isolating the reactive atmosphere from the ambient atmosphere. Still further, in another preferred embodiment, wetting enhancer may be incorporated directly into the filler material rather than being alloyed with the matrix metal.

Thus, wetting of the filler material by the matrix metal may enhance the properties (e.g., tensile strength, erosion resistance, etc.) of the resultant composite body. Further, wetting of the filler material by molten matrix metal may permit a uniform dispersion of filler throughout the formed metal matrix and improve bonding of the filler to the matrix metal. Useful wetting enhancers for an aluminum matrix metal include magnesium, bismuth, lead, tin, etc., and for bronze and copper include selenium, tellurium, sulfur, etc. Moreover, as discussed above, at least one wetting enhancer may be added to the matrix metal and/or filler material to impart desired properties to the resultant metal matrix composite body.

Moreover, it is possible to use a reservoir of matrix metal to ensure complete infiltration of matrix metal into the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which is molten at the processing temperature could be used as the reservoir metal. Molten metals frequently are very miscible with each other which would result in the reservoir metal mixing with the first source of matrix metal, so long as an adequate amount of time is given for the mixing to occur. Thus, by using a reservoir metal which is different in composition from the first source of matrix metal, it is possible to tailor the properties of the matrix metal to meet various operating requirements and thus tailor the properties of the metal matrix composite body.

The temperature to which the reaction system is exposed (e.g., processing temperature) may vary depending upon which matrix metals, filler materials or preforms, and reactive atmospheres are used. For example, for an aluminum matrix metal, the present self-generated vacuum process generally proceeds at a temperature of at least about 700° C. and preferably about 850° C. or more. Temperatures in excess of 1000° C. are generally not necessary, and a particularly useful range is 850° C. to 1000° C. For a bronze or copper matrix metal, temperatures of about 1050° C. to about 1125° C. are useful, and for cast iron, temperatures of about 1250° C. to about 1400° C. are suitable. Generally, temperatures which are above the melting point but below the volatilization point of the matrix metal may be used.

It is possible to tailor the composition and/or microstructure of the metal matrix during formation of the composite to impart desired characteristics to the resulting product. For example, for a given system, the process conditions may be selected to control the formation of, e.g., intermetallics, oxides, nitrides, etc. Further, in addition to tailoring the composition of the composite body, other physical characteristics, e.g., porosity, may be modified by controlling the cooling of the metal matrix composite body. In some cases, it may be desirable for the metal matrix composite to be directionally solidified by placing, for example, the container holding the formed metal matrix composite onto a chill plate and/or selectively placing insulating materials about the container. Further, additional properties (e.g., tensile strength) of the formed metal matrix composite may be controlled by using a heat treatment (e.g., a standard heat treatment which corresponds substantially to a heat treatment for the matrix metal alone, or one which has been modified partially or significantly).

Under the conditions employed in the method of the present invention, the mass of filler material or preform should be sufficiently permeable to allow the reactive atmosphere to penetrate or permeate the filler material or preform at some point during the process prior to isolation of the ambient atmosphere from the reactive atmosphere. In the Examples below, a sufficient amount of reactive atmosphere was contained within loosely packed particles having particle sizes ranging from about 54 to about 220 grit. By providing such a filler material, the reactive atmosphere may, either partially or substantially completely, react upon contact with the molten matrix metal and/or filler material and/or impermeable container, thereby resulting in the creation of a vacuum which draws molten matrix metal into the filler material. Moreover, the distribution of reactive atmosphere within the filler material does not have to be substantially uniform, however, a substantially uniform distribution of reactive atmosphere may assist in the formation of a desirable metal matrix composite body.

The inventive method of forming a metal matrix composite body is applicable to a wide variety of filler materials, and the choice of materials will depend largely on such factors as the matrix metal, the processing conditions, the reactivity of molten matrix metal with the reactive atmosphere, the reactivity of the filler material with the reactive atmosphere, the reactivity of molten matrix metal with the impermeable container and the properties sought for the final composite product. For example, when the matrix metal comprises aluminum, suitable filler materials include (a) oxides (e.g., alumina); (b) carbides (e.g., silicon carbide); (c) nitrides (e.g., titanium nitride); If there is a tendency for the filler material to react adversely with the molten matrix metal, such reaction might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, nitrides. Ceramics which are preferred for use in the present method include alumina and silicon carbide in the form of particles, platelets, whiskers and fibers. The fibers can be discontinuous (in chopped form) or in the form of continuous filaments, such as multifilament tows. Further, the composition and/or shape of the filler material or preform may be homogeneous or heterogeneous.

The size and shape of the filler material can be any that may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be required to obtain complete infiltration of a mass of smaller particles than for larger particles. Average filler material sizes ranging from less than 24 grit to about 500 grit are preferred for most technical applications. Moreover, by controlling the size (e.g., particle diameter, etc.) of the permeable mass of filler material or preform, the physical and/or mechanical properties of the formed metal matrix composite may be tailored to meet an unlimited number of industrial applications. Still further, by incorporating a filler material comprising varying particle sizes of filler material, higher packing of the filler material may be achieved to tailor the composite body. Also, it is possible to obtain lower particle loadings, if desired, by agitating the filler material (e.g., shaking the container) during infiltration and/or by mixing powdered matrix metal with the filler material prior to infiltration.

The reactive atmosphere utilized in the method of the present invention may be any atmosphere which may react, at least partially or substantially completely, with the molten matrix metal and/or the filler material and/or the impermeable container, to form a reaction product which occupies a volume which is smaller than that volume occupied by the atmosphere and/or reaction components prior to reaction. Specifically, the reactive atmosphere, upon contact with the molten matrix metal and/or filler material and/or impermeable container, may react with one or more components of the reaction system to form a solid, liquid or vapor-phase reaction product which occupies a smaller volume than the combined individual components, thereby creating a void or vacuum which assists in drawing molten matrix metal into the filler material or preform. Reaction between the reactive atmosphere and one or more of the matrix metal and/or filler material and/or impermeable container, may continue for a time sufficient for the matrix metal to infiltrate, at least partially or substantially completely, the filler material. For example, when air is used as the reactive atmosphere, a reaction between the matrix metal (e.g., aluminum) and air may result in the formation of reactive products (e.g., alumina and/or aluminum nitride, etc.). Under the process conditions, the reaction product(s) tend to occupy a smaller volume than the total volume occupied by the molten aluminum and the air. As a result of the reaction, a vacuum is generated, thereby causing the molten matrix metal to infiltrate the filler material or preform. Depending on the system utilized, the filler material and/or impermeable container may react with the reactive atmosphere in a similar manner to generate a vacuum, thus assisting in the infiltration of molten matrix metal into the filler material. The self-generated vacuum reaction may be continued for a time sufficient to result in the formation of a metal matrix composite body.

In addition, it has been found that a seal or sealing means, should be provided to help prevent or restrict gas flow from the ambient atmosphere into the filler material or preform (e.g., prevent flow of ambient atmosphere into the reactive atmosphere). Referring again to FIG. 1A, the reactive atmosphere within the impermeable container 32 and filler material 31 should be sufficiently isolated from the ambient atmosphere 37 so that as the reaction between the reactive atmosphere and the molten matrix metal 31 and/or the filler material or preform 31 and/or the impermeable container 32 proceeds, a pressure difference is established and maintained between the reactive and ambient atmospheres until the desired infiltration has been achieved. It will be understood that the isolation between the reactive and ambient atmospheres need not be perfect, but rather only "sufficient", so that a net pressure differential is present (e.g., there could be a vapor phase flow from the ambient atmosphere to the reactive atmosphere so long as the flow rate was lower than that needed immediately to replenish the reactive atmosphere). As described above, part of the necessary isolation of the ambient atmosphere from the reactive atmosphere is provided by the impermeability of the container 32. Since most matrix metals are also sufficiently impermeable to the ambient atmosphere, the molten matrix metal pool 33 provides another part of the necessary isolation. It is important to note, however, that the interface between the impermeable container 32 and the matrix metal may provide a leakage path between the ambient and reactive atmospheres. Accordingly, a seal should be provided that sufficiently inhibits or prevents such leakage.

Suitable seals or sealing means may be classified as mechanical, physical, or chemical, and each of those may be further classified as either extrinsic or intrinsic. By "extrinsic" it is meant that the sealing action arises independently of the molten matrix metal, or in addition to any sealing action provided by the molten matrix metal (for example, from a material added to the other elements of the reaction system); by "intrinsic" it is meant that the sealing action arises exclusively from one or more characteristics of the matrix metal (for example, from the ability of the matrix metal to wet the impermeable container). An intrinsic mechanical seal may be formed by simply providing a deep enough pool of molten matrix metal or by submerging the filler material or preform, as in the above-cited patents to Reding and Reding et al. and those patents related thereto.

Nevertheless, it has been found that intrinsic mechanical seals as taught by, for example, Reding, Jr., are ineffective in a wide variety of applications, and they may require excessively large quantities of molten matrix metal. In accordance with the present invention, it has been found that extrinsic seals and the physical and chemical classes of intrinsic seals overcome those disadvantages of an intrinsic mechanical seal. In a preferred embodiment of an extrinsic seal, a sealing means may be externally applied to the surface of the matrix metal in the form of a solid or a liquid material which, under the process conditions, may be substantially non-reactive with the matrix metal. It has been found that such an extrinsic seal prevents, or at least sufficiently inhibits, transport of vapor-phase constituents from the ambient atmosphere to the reactive atmosphere. Suitable materials for use as extrinsic physical sealing means may be either solids or liquids, including glasses (e.g., boron or silicon glasses, $B_2O_3$, molten oxides, etc.) or any other material(s) which sufficiently inhibit transport of ambient atmosphere to the reactive atmosphere under the process conditions.

An extrinsic mechanical seal may be formed by pre-smoothing or prepolishing or otherwise forming the interior surface of the impermeable container contacting the pool of matrix metal so that gas transport between the ambient atmosphere and the reactive atmosphere is sufficiently inhibited. Glazes and coatings such as $B_2O_3$ that may be applied to the container to render it impermeable can also provide suitable sealing.

An extrinsic chemical seal could be provided by placing a material on the surface of a molten matrix metal that is reactive with, for example, the impermeable container. The reaction product could comprise an intermetallic, an oxide, a carbide, etc.

In a preferred embodiment of an intrinsic physical seal, the matrix metal may react with the ambient atmosphere to form a seal or sealing means having a composition different from the composition of the matrix metal. For example, upon reaction of the matrix metal with the ambient atmosphere a reaction product (e.g., MgO and/or magnesium aluminate spinel in the case of an Al-Mg alloy reacting with air, or copper oxide in the case of a bronze alloy reacting with air) may form which may seal the reactive atmosphere from the ambient atmosphere. In a further embodiment of an intrinsic physical seal, a seal facilitator may be added to the matrix metal to facilitate the formation of a seal upon reaction between the matrix metal and the ambient atmosphere (e.g., by the addition of magnesium, bismuth, lead, etc., for aluminum matrix metals, or by the addition of selenium, tellurium, sulfur, etc., for copper or bronze matrix metals. In forming an intrinsic chemical sealing means, the matrix metal may react with the impermeable container (e.g., by partial dissolution of the container or its coating (intrinsic) or by forming a reaction product or intermetallics, etc., which may seal the filler material from the ambient atmosphere.

Further, it will be appreciated that the seal should be able to conform to volumetric (i.e., either expansion or contraction) or other changes in the reaction system without allowing ambient atmosphere to flow into the filler material (e.g., flow into the reactive atmosphere). Specifically, as molten matrix metal infiltrates into the permeable mass of filler material or preform, the depth of molten matrix metal in the container may tend to decrease. Appropriate sealing means for such a system should be sufficiently compliant to prevent gas transport from the ambient atmosphere to the filler material as the level of molten matrix metal in the container decreases.

A barrier means may also be utilized in combination with the present invention. Specifically, a barrier means which may be used in the method of this invention may be any suitable means which interferes, inhibits, prevents or terminates the migration, movement, or the like, of molten matrix metal beyond the defined surface boundary of the filler material. Suitable barrier means may be any material, compound, element, composition, or the like, which, under the process conditions of this invention, maintains some structural integrity, is not volatile and is capable of locally inhibiting, stopping, interfering with, preventing, or the like, continued infiltration or any other kind of movement beyond the defined surface boundary of the filler material. Barrier means may be used during self-generated vacuum infiltration or in any impermeable container utilized in connection with the self-generated vacuum technique for forming metal matrix composites, as discussed in greater detail below.

Suitable barrier means include materials which are either wettable or non-wettable by the migrating molten matrix metal under the process conditions employed, so long as wetting of the barrier means does not proceed substantially beyond the surface of barrier material (i.e., surface wetting). A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product.

Suitable barriers particularly useful for aluminum matrix metals are those containing carbon, especially the crystalline allotropic form of carbon known as graphite. Graphite is essentially non-wettable by the molten aluminum alloy under the described process conditions. A particular preferred graphite is the graphite tape product GRAFOIL ® which exhibits characteristics that prevent the migration of molten aluminum alloy beyond the defined surface boundary of the filler material. This graphite tape is also resistant to heat and is substantially chemically inert. GRAFOIL ® graphite tape is flexible, compatible, conformable and resilient, and it can be made into a variety of shapes to fit most any barrier application. Graphite barrier means may also be employed as a slurry or paste or even as a paint film around and on the boundary of the filler material or preform. GRAFOIL ® tape is particularly preferred because it is in the form of a flexible graphite sheet. One method of using this paper-like graphite sheet material is to wrap the filler material or preform to be infiltrated within a layer of the GRAFOIL ® material. Alternatively, the graphite sheet material can be formed into a negative mold of a shape which is desired for a metal matrix composite body and this negative mold can then be filled with filler material.

In addition, other finely ground particulate materials, such as 500 grit alumina, can function as a barrier, in certain situations, so long as infiltration of the particulate barrier material would occur at a rate which is slower than the rate of infiltration of the filler material.

The barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, self-generated vacuum infiltration substantially terminates when the infiltrating matrix metal reaches the defined surface boundary and contacts the barrier means.

The present method of forming a metal matrix composite by a self-generating vacuum technique, in combination with the use of a barrier means, provides significant advantages over the prior art. Specifically, by utilizing the method of the present invention, a metal matrix composite body may be produced without the need for expensive or complicated processing. In one aspect of the present invention, an impermeable container, which may be commercially available or tailored to a specific need, may contain a filler material or preform of a desired shape, a reactive atmosphere and a barrier means for stopping infiltration of the metal matrix composite beyond the surface of the resultant formed composite body. Upon contact of the reactive atmosphere with the matrix metal, which may be poured into the impermeable container, and/or filler material under the process conditions, a self-generated vacuum may be created, thereby causing the molten matrix metal to infiltrate into the filler material. The instant method avoids the need for complex processing steps, e.g., machining of molds into complex shapes, maintaining molten metal baths, removal of formed pieces from complex-shaped molds, etc. Further, displacement of filler material by molten matrix metal is substantially minimized by providing a stable container which is not submerged within a molten bath of metal.

Various demonstrations of the present invention are included in the Examples immediately following. However, these Examples should be considered as being illustrative and should not be construed as limiting the scope of the invention as defined in the appended claims.

EXAMPLE 1

This Example demonstrates the feasibility and importance of using an extrinsic seal which assists in the formation of an aluminum metal matrix composite. Specifically, two similar lay-ups were made. The one difference between the two lay-ups was that one lay-up was provided with an extrinsic seal forming material and the other was not provided with an extrinsic seal forming material.

Figure 1B:
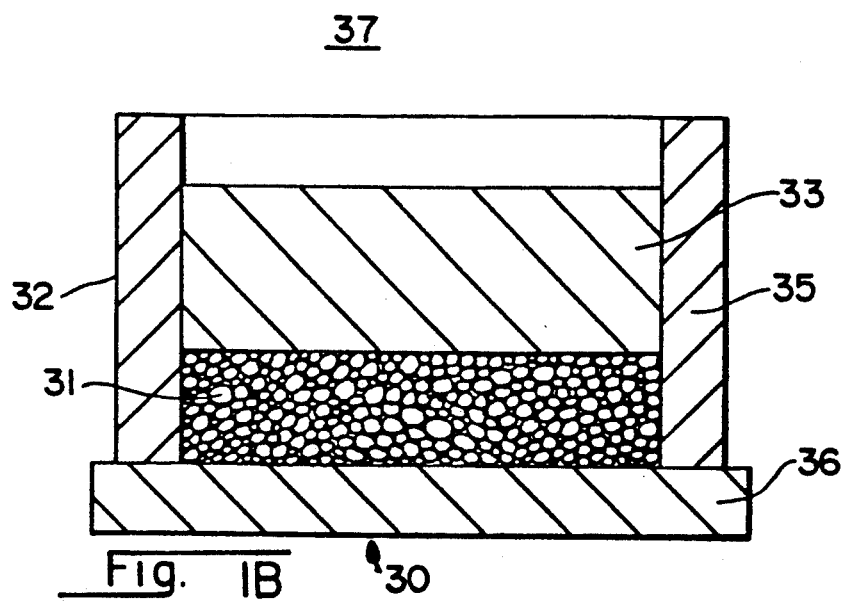
FIG. 1B is a schematic cross-sectional view of a comparative lay-up.

FIGS. 1A and 1B are cross-sectional schematic views of the experimental lay-ups used according to Example 1. The Figures show that the lay-ups were identical except that FIG. 1A includes the use of an extrinsic sealing material 34. As shown in each of FIGS. 1A and 1B, two impermeable containers 32, having an inner diameter of about 2⅜ inch (60 mm) and a height of about a 2½ inch (64 mm) were constructed from 16 gauge (1.6 mm thick) AISI Type 304 stainless steel. Each of the containers 32 was made by welding a 16 gauge (1.6 mm thick) stainless steel tube 35 having about a 2⅜ inch (60 mm) inner diameter and about a 2 ½ inch (64 mm) length to a 3¼ (83 mm)×3¼(83 mm) inch 16 gauge (1.6 mm thick) stainless steel plate 36. Each of the impermeable containers 32 were filled with about 150 grams of filler material 31 comprising a 90 grit alumina product known as 38 ALUNDUM ® from Norton Co. Approximately 575 grams of a molten matrix metal 33 comprising a commercially available aluminum alloy designated 170.1 was poured into each container 32, each of which was at room temperature, to cover the filler material 31. The molten matrix metal was at a temperature of about 900° C. The molten matrix metal 33 was then covered with a seal forming material 34. Specifically, about 20 grams of a $B_2O_3$ powder from Aesar Co. of Seabrook, N.H., was placed onto the molten aluminum matrix metal 33. Each of the experimental lay-ups were then placed into a resistance heated air atmosphere box furnace which was preheated to a temperature of about 900° C. After about fifteen minutes at temperature, the $B_2O_3$ material 34 had substantially completely melted to form a glassy layer. Moreover, any water which had been trapped in the $B_2O_3$ substantially completely degassed, thereby forming a gas impermeable seal. Each of the lay-ups shown in FIGS. 1A and 1B was maintained in the furnace for about an additional two hours at about 900° C. Thereafter, both lay-ups were removed from the furnace and the plates 36 of the container 32 were placed into direct contact with a water cooled copper chill plate to directionally solidify the matrix metal.

Figure 3A:
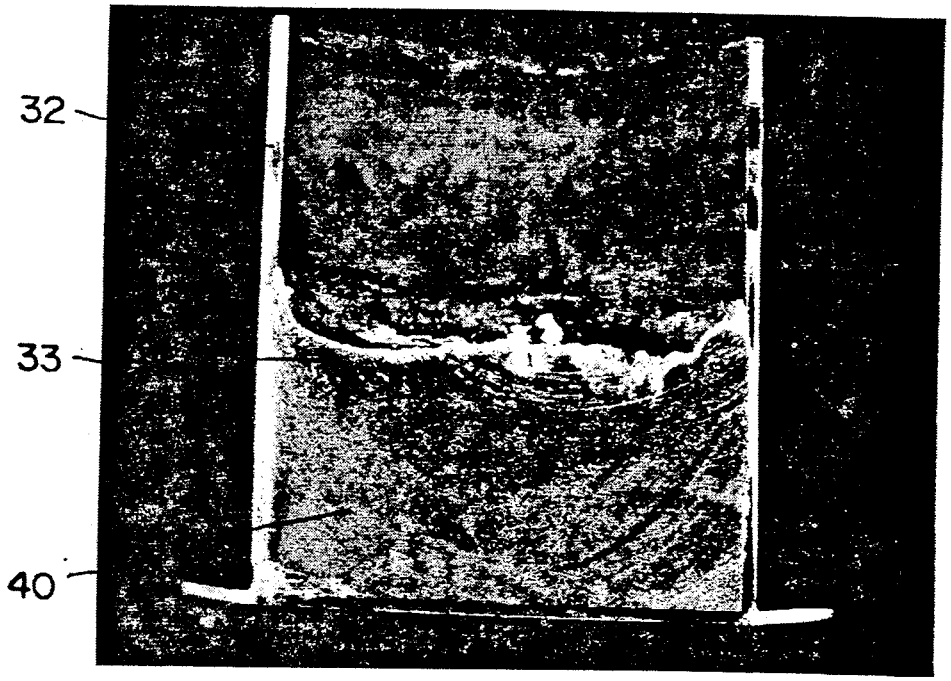
FIG. 3A is a photograph which corresponds to the product formed according to FIG. 1A.
Figure 3B:
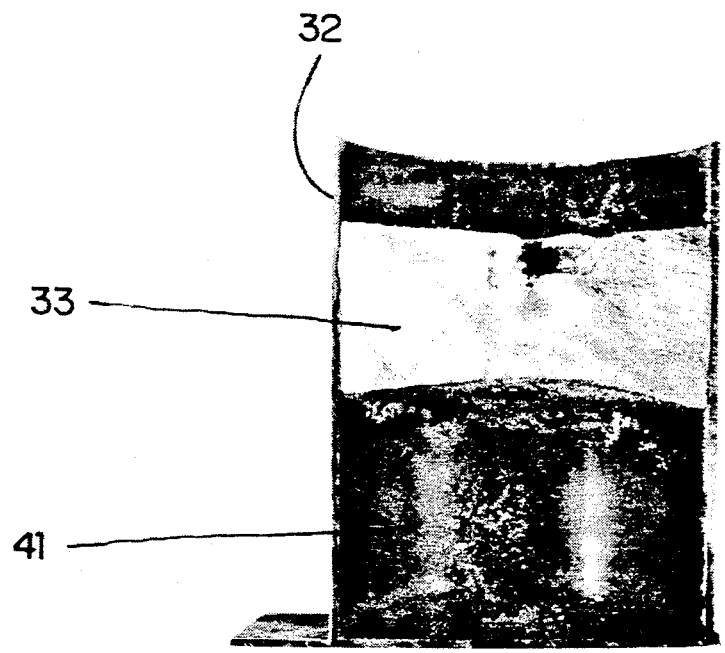
FIG. 3B is a photograph which corresponds to the product formed according to FIG. 1B.

Each of the lay-ups was cooled to room temperature and then was cross-sectioned to determine whether the matrix metal 33 had infiltrated the filler material 31 to form a metal matrix composite. It was observed that the lay-up shown in FIG. 1A, which used the sealing material 34, formed a metal matrix composite, whereas the lay-up shown in FIG. 1B, which did not use a sealing material 34, did not form a metal matrix composite. Specifically, FIG. 3A is a photograph which corresponds to the product formed according to FIG. 1A, whereas FIG. 3B is a photograph which corresponds to the result of FIG. 1B. FIG. 3A shows that an aluminum metal matrix composite body 40 was formed and a small amount of residual matrix metal 33 remained attached thereto. Moreover, FIG. 3B shows that no metal matrix composite body was formed. Specifically, FIG. 3B shows a cavity 41 which corresponds to the original location of the filler material 31 shown in FIG. 1B. When the container 32 was cross-sectioned, the filler material 31 fell out of the container 32 because the filler material 31 had not been infiltrated by the matrix metal 33.

EXAMPLE 2

This Example demonstrates the feasibility and importance of using an extrinsic seal which assists the formation of a bronze metal matrix composite body. The experimental procedures and lay-ups discussed in Example 1 were substantially repeated, except that the matrix metal 33 comprised a bronze alloy of about 93% by weight Cu, about 6% by weight Si and about 1% by weight Fe. The composition and amount of the filler material 31 were substantially the same as discussed in Example 1. Moreover, the stainless steel containers 32 and $B_2O_3$ seal forming material 34 were substantially identical to those materials in Example 1. The bronze matrix metal 33 was preheated to a temperature of about 1025° C. to render it molten prior to it being poured into the room temperature container 32. Each of the lay-ups, comprising the stainless steel containers 32 and their contents, was placed into the same resistance heated air atmosphere box furnace used in Example 1, except that the furnace was preheated to a temperature of about 1025° C. The temperature in the furnace was then raised to about 1100° C. over about twenty minutes during which time the $B_2O_3$ powder had substantially melted, degassed, and formed a gas tight seal. Both lay-ups were then held at about 1100° C. for approximately two hours. Each of the lay-ups was removed from the furnace and the plates 36 of the container 32 were placed into direct contact with a water cooled copper chill plate to directionally solidify the matrix metal.

Figure 4A:
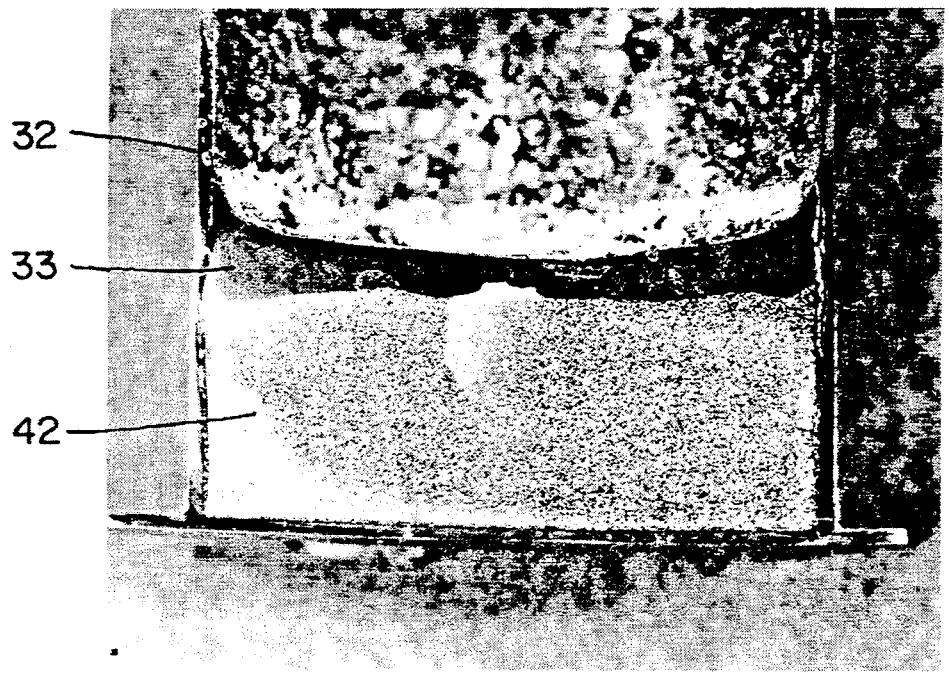
FIG. 4A is a photograph which corresponds to a bronze metal matrix composite produced according to FIG. 1A.
Figure 4B:
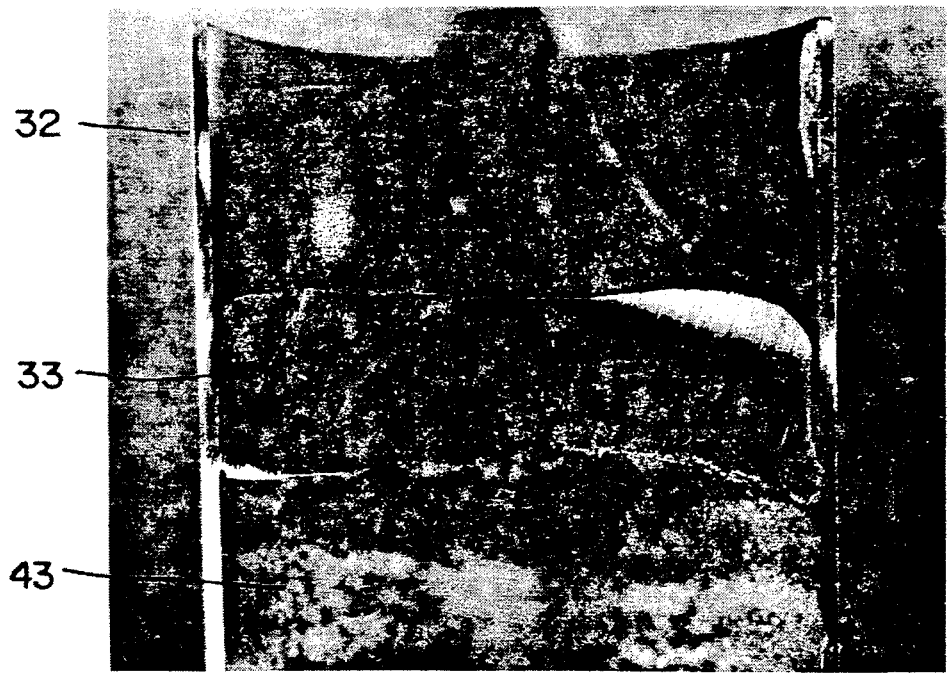
FIG. 4B corresponds to the result that was achieved with a bronze matrix metal corresponding to FIG. 1B.

Each of the lay-ups was cooled to room temperature and then was cross-sectioned to determine whether the bronze matrix metal 33 had infiltrated the filler material 31 to form a metal matrix composite. Similar to what was observed in Example 1, the lay-up which utilized the $B_2O_3$ sealing material 34 formed a bronze metal matrix composite, whereas the container without the $B_2O_3$ sealing material 34 did not form a metal matrix composite. Specifically, FIG. 3A shows the bronze metal matrix composite body 42 which was formed using the lay-up shown in FIG. 1A; whereas FIG. 4B shows a cavity 43 which corresponds to the original location of the filler material 31 shown in FIG. 1B. Similar to Example 1, the infiltrated filler material 31 fell out of the container 32 when the container 32 was cross-sectioned.

EXAMPLE 3

This Example demonstrates the importance of using a gas impermeable container which assists in the formation of aluminum metal matrix composites. Specifically, one gas permeable and four gas impermeable containers were compared. The four impermeable containers included an impermeable 16 gauge AISI Type 304 stainless steel can, a commercially available glazed coffee cup, a 16 gauge AISI Type 304 stainless steel can coated on an interior portion thereof with $B_2O_3$ and a glazed $Al_2O_3$ body. The permeable container comprised a porous clay crucible. Table 1 sets forth a summary of the relevant experimental parameters.

SAMPLE A

A Type 304 stainless steel can having an inner diameter of about 2⅜ (60 mm) inches and a height of about 2½ (64 mm) inches was partially filled with approximately 150 grams of 90 mesh 38 ALUNDUM ® from the Norton Co. An aluminum matrix metal having a composition of (by weight percent) 7.5-9.5% Si, 3.0-4.0% Cu, <2.9% Zn, 2.2-2.3% Mg, <1.5% Fe, <0.5 Mn, <0.35 Sn, and the balance Al, was melted in a resistance heated air atmosphere box furnace at about 900° C. and poured into the stainless steel can. Powdered $B_2O_3$ from Aesar Co. was used to cover the molten aluminum surface. (The lay-up was the same as that shown in FIG. 1A.) The lay-up, comprising the container and its contents, was placed into a resistance heated air atmosphere box furnace at 900° C. After about fifteen minutes at temperature, the $B_2O_3$ powder had substantially completely melted and degassed to form a gas impermeable seal over the aluminum matrix metal surface. The lay-up was maintained in the furnace for an additional two hours. The lay-up was removed from the furnace and was contacted with a water cooled copper chill plate to directionally solidify the matrix metal.

SAMPLE B

The procedure set forth above in Sample A were followed, except that the container 32 (set forth in FIG. 1A) comprised a commercially available glazed coffee cup.

SAMPLE C

An impermeable container having an inner diameter of about 1.7 inches (43 mm) and a height of about 2.5 inches (64 mm) and constructed from 16 gauge (1.6 mm thick) AISI Type 304 stainless steel, was coated on an interior portion thereof with a layer of $B_2O_3$ powder from the Aesar Co. of Johnson Matthey in Seabrook N.H. Specifically about ½ inch (13 mm) of $B_2O_3$ powder was placed into the container. The container was then placed into a resistance heated air atmosphere furnace set at about 1000° C. Sufficient time was allowed for the $B_2O_3$ to substantially melt and degas. Once melted, the stainless steel container with the molten $B_2O_3$ was removed from the furnace and rotated such that the molten $B_2O_3$ flowed over substantially all the interior portion of the stainless steel container. With the surface substantially completely coated, a filler material comprising 54 grit SiC 39 CRYSTOLON ® from the Norton Co., was placed inside the container, which was then at a temperature of about 90° C., to a depth of about ¾ inch (19 mm). A molten matrix metal consisting of commercially pure aluminum and designated alloy 1100 was poured into the container to a depth of about ¾ inch (19 mm) to cover the filler material. The $B_2O_3$ coated container and its contents were then placed into a resistance heated air atmosphere box furnace set at about 1000° C. for about 15 minutes. About 20 grams of $B_2O_3$ powder was then placed on the surface of the molten matrix metal. After about fifteen minutes at temperature, the $B_2O_3$ powder had substantially completely melted and degassed to form a seal. The lay-up was maintained in the furnace an additional one hour. The stainless steel container and its contents were then removed from the furnace and allowed to cool to room temperature and solidify.

SAMPLE D

An impermeable cylindrical shaped container measuring about 6 inches (152 mm) high and having a 2 inch (51 mm) outer diameter was made. Specifically, the container was made by first slipcasting a slip which comprised a mixture of about 84.2% by weight of $Al_2O_3$ (A-17 from Alcoa, Pittsburgh, Pa.), about 1% by weight of "Darvan 821A" (supplied by R. T. Vanderbilt and Company, Norwalk, Conn.) and about 14.8% by weight of distilled water. The slip was prepared by ball-milling in a five gallon (18.9 liter) Nalgene ® plastic jar that was about ¼ filled with about ½ inch (13 mm) aluminum grinding media for about 2 hours.

The slipcast cylinder was dried at about ambient temperature for about 1 day, subsequently heated to about 1400° C. at a rate of about 200° C./hr and held at about 1400° C. for 2 hours and again cooled to ambient temperature. After firing and cooling, the outside of the cylinder was dip coated with a mixture comprising, by weight, about 60% a FL-79 frit (supplied by Fusion Ceramics, Carroliton, Ohio) and the balance ethanol. The frit coated cylinder was then heated and cooled at about 200° C./hour to 1000° C. in a resistance heated furnace, to glaze the $Al_2O_3$ cylinder and make it gas impermeable. Once cooled, the glaze coated shell was partially filled with 90 grit 39 CRYSTOLON SiC. The lay-up, comprising the glaze coated shell and its contents, was then placed into a furnace and heated to about 950° C. at a rate of about 200° C./hr. While within the furnace, a molten matrix metal comprising by weight about 10% magnesium, about 10% silicon and the balance aluminum, was poured into the mold. Powdered $B_2O_3$ was then poured onto the surface of the molten matrix metal. After about an hour at about 950° C., the furnace was cooled to about 850° C. at which time the shell and its contents were removed from the furnace, solidified and water quenched. The shell comprising the glaze covered alumina body cracked and spalled off during the quenching to reveal a smooth surfaced metal matrix composite.

Once at room temperature, each of the lay-ups was cross-sectioned to determine whether the matrix metal had infiltrated the filler material to form a metal matrix composite. In each of Samples A–D, a metal matrix composite was formed.

SAMPLE E

The procedures set forth above in Sample A were followed, except that the container 32 set forth in FIG. 1A comprised a porous clay crucible (DFC crucible No. 28-1000, from J. H. Berge Co, South Plainfield, N.J.). A metal matrix composite body was not formed. Thus, this Example demonstrates the need for an impermeable container.

EXAMPLE 4

This Example demonstrates the importance of using a gas impermeable container which assists in the formation of bronze metal matrix composites. Specifically, one gas permeable and two gas impermeable containers were compared. The two impermeable containers included an AISI Type 304 stainless steel can, and a carbon steel container coated with colloidal graphite. The permeable container comprised a porous clay crucible. Table 1 sets forth a summary of the relevant experimental procedures.

SAMPLE F

A Type 304 stainless steel can having an inner diameter of about 2⅜ inches (60 mm) and a height of about 2½ inches (64 mm), was partially filled with approximately 150 grams of 90 mesh 38 ALUNDUM ® from the Norton Co. A matrix metal comprising about 6% by weight Si, 1% by weight Fe and the balance Cu, was melted in an air atmosphere box furnace at a temperature of about 1025° C. and poured into the stainless steel container. Powdered $B_2O_3$ from Aesar Co. was used to cover the molten bronze surface. The lay-up was placed into a resistance heated box furnace at about 1025° C. The furnace temperature was then raised to about 1100° C. over about twenty minutes during which time the $B_2O_3$ powder substantially completely melted, degassed and formed a gas impermeable seal over the bronze matrix metal surface. After an additional two hours, the lay-up was removed from the furnace and was contacted with a water cooled copper chill plate to directionally solidify the matrix metal.

SAMPLE G

An impermeable container having a trapezoidal cross-section with a closed end measuring about 3 by 3 inches (76 by 76 mm) and an open end measuring about 3.75 by 3.75 inches (92 by 92 mm) and a height of about 2.5 inches (64 mm) was made from 14 gauge (2 mm thick) carbon steel by welding individual pieces together. The inner surface of the container was coated with a graphite mixture comprising about 1.5 parts by volume ethanol from Pharmco Products, Inc., of Bayonne, N.J., and about one part by volume DAG ® 154 colloidal graphite from Atheson Colloids, Port Horon, Mich. At least three coats of the graphite mixture were applied with an air brush onto the inner surface of the container. Each coat of the graphite mixture was permitted to dry before a subsequent coat was applied. The coated container was placed into a resistance heated air atmosphere furnace set at about 380° C. for about 2 hours. About ½ inch (13 mm) of an alumina filler mate- a self-generated vacuum that produces a metal matrix composite.

TABLE 1

| SAMPLE ID | MATRIX METAL | FILLER | TEMPERATURE (°C.) | PROCESSING TIME (HOURS) | CONTAINER | METAL MATRIX COMPOSITE FORMED |
| --- | --- | --- | --- | --- | --- | --- |
| A | Aluminum alloy[1] | 90# Al$_2$O$_3$+ | 900 | 2.25 | Type 304 SS | yes |
| B | Aluminum alloy[1] | 90# Al$_2$O$_3$+ | 900 | 2.25 | Glazed coffee cup | yes |
| C | 1100 | 54# SiC++ | 1000 | 1.5 | B$_2$O$_3$ coated Type 304 SS | yes |
| D | Al-10% Si-10% Mg | 90# SiC++ | 950 | 4 | Glazed slip cast Al$_2$O$_3$ shell | yes |
| E | Aluminum alloy[1] | 90# Al$_2$O$_3$+ | 900 | 2.25 | Clay crucible | no |
| F | 93% Cu-6% Si-1% Fe | 90# Al$_2$O$_3$+ | 1100 | 2.25 | Type 304 SS | yes |
| G | 93% Cu-6% Si-0.5% Fe-0.5% Al | 90# Al$_2$O$_3$+++ | 1100 | 2.25 | Colloidal graphite coated plain carbon steel | yes |
| H | 93% Cu-6% Si-1% Fe | 90# Al$_2$O$_3$+ | 1100 | 2.25 | Clay crucible | no |

+38 Alundum ®, Norton Co., Worcester, MA
++39 Crystolon ®, Norton Co., Worcester, MA
+++El Alundum ®Norton Co., Worcester, MA
"#" denotes "grit"
"SS" denotes "stainless steel"
[1](7.5-9.5% Si, 3.0-4.0% Cu, <2.9% Zn, 2.2-2.3% Mg, <1.5% Fe, <0.5% Mn, <0.5% Ni, <0.35% Sn and the balance Al)

rial comprising 90 grit E1 ALUNDUM ® from the Norton Co., was placed into the bottom of the container and was substantially leveled. The leveled surface of the alumina filler material was then substantially completely covered with a graphite tape product having a thickness of about 0.01 inch (0.25 mm), (a grade PF-25-H graphite tape product from TT America, Inc., Portland, Oreg.) sold under the tradename Perma-foil. About ½ inch (13 mm) of a molten matrix metal comprising by weight about 6% silicon, about 0.5% Fe, about 0.5% Al and the balance copper, was poured into the room temperature container onto the graphite tape and the alumina filler material About 20 grams of B$_2$O$_3$ powder was poured onto the molten bronze matrix metal. The lay-up, comprising the carbon steel container and its contents, was placed into a resistance heated air atmosphere box furnace at a temperature of about 1100° C. After about 2.25 hours at about 1100° C., during which time the B$_2$O$_3$ had substantially completely melted, degassed and formed a seal, the carbon steel container and its contents were removed from the furnace and placed onto a water cooled copper chill plate to directionally solidify the matrix metal. Although the molten matrix metal had dissolved a portion of the plain carbon steel container, a metal matrix composite body was recovered from the lay-up.

SAMPLE H

The procedures set forth in Sample F were followed, except that the container 32 (set forth in FIG. 1A) comprised a porous clay crucible (DFC crucible No. 28-1000, from J. H. Berge Co., South Plainfield N.J.), and the lay-up was placed directly into the furnace at 1100° C., rather than 1025° C. with subsequent heating.

Once at room temperature, each of the lay-ups corresponding to Samples F, G, and H were cross-sectioned to determine whether the matrix metal had infiltrated the filler material to a form metal matrix composite body. It was observed that the lay-ups corresponding to Samples F and G created conditions favorable to the formation of a metal matrix composite body, whereas the lay-up corresponding to Sample H, with the gas impermeable clay crucible, did not create favorable conditions for the formation of a metal matrix composite body.

This Example illustrates the need for a gas impermeable container in conjunction with a gas impermeable seal to create conditions favorable for the formation of

EXAMPLE 5

This Example demonstrates that a variety of matrix metals 33 (in reference to FIG. 1A) can be used in combination with a gas impermeable container 32 and a gas impermeable seal 34 to create conditions favorable for the formation of metal matrix composite bodies. Table 2 contains a summary of the experimental conditions used to form a plurality of metal matrix composite bodies, including various matrix metals 33, filler materials 31, containing methods 32, processing temperatures and processing times.

SAMPLES I-M

For Samples I-M, the lay-up shown in FIG. 1A and the steps set forth in Example 1 were substantially repeated. The amount of filler used for each of these lay-ups was about 150 grams while the amount of alloy was about 525 grams. Metal matrix composite bodies were successfully produced from each of the experimental lay-ups.

SAMPLES N-O

For Samples N and O, the method of Example 1 was substantially repeated, except that the furnace temperature was about 1100° C.

SAMPLE P

Figure 5:
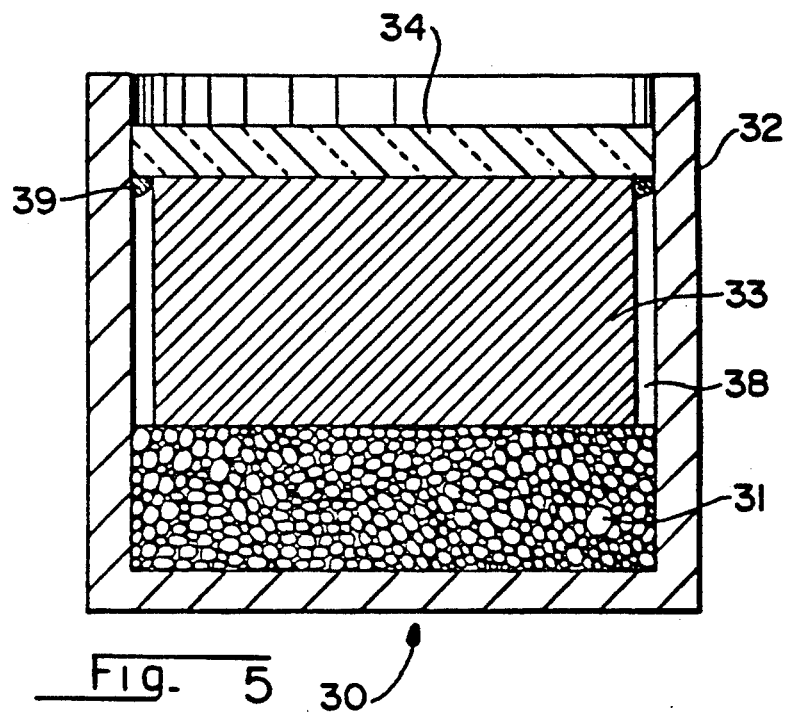
FIG. 5 is a schematic cross-sectional view of the lay-up used to make Sample P.

The experimental lay-up used for Sample P was slightly different from all previous experimental lay-ups discussed above herein. The entire lay-up was constructed at room temperature and was placed into an electric resistance furnace at room temperature. Specifically, as shown in FIG. 5, a dense, sintered alumina crucible 32 about 4 inches (102 mm) high having an inner diameter of about 2.6 inches (66 mm), from Bolt Ceramics of Conroe, Tex., was utilized as the impermeable container. Ninety grit 38 ALUNDUM ® Al$_2$O$_3$ filler 31 from Norton Co. was placed into the bottom of the crucible 32. A solid cylindrical ingot of matrix metal 33 comprising a gray cast iron (ASTM A-48, Grade 30, 35) was placed on top of the filler material 31 such that a gap 38 was created between the matrix metal 33 and side walls of the container 32. Plaster of paris 39 (BONDEX ® International Inc., Brunswick, Ohio) was placed into a portion of the gap 38 near a top portion of the cast iron ingot 33 within the container 32. Moreover, the plaster of paris 39 functioned to isolate powdered $B_2O_3$ 34, which was placed on a top surface of the matrix metal 33, from the filler material 31, thereby assisting in the formation of a sealing means under the process conditions. The lay-up shown in FIG. 5 was placed into a resistance heated air atmosphere furnace and heated from room temperature to about 1400° C. in about 7 hours during which time the $B_2O_3$ 34 substantially melted, degassed and formed a gas impermeable seal upon the molten cast iron 33. Upon melting, the level of molten cast iron 33 was observed to drop after about four hours at temperature. The lay-up 30 was removed from the furnace and cooled.

SAMPLES Q-T

For Samples Q-T the lay-up shown in FIG. 1A and the steps set forth in Example 1 were substantially repeated. The specific parameters of matrix metal, filler material, container, temperatures and times are set forth in Table 2.

SAMPLE U

Figure 6:
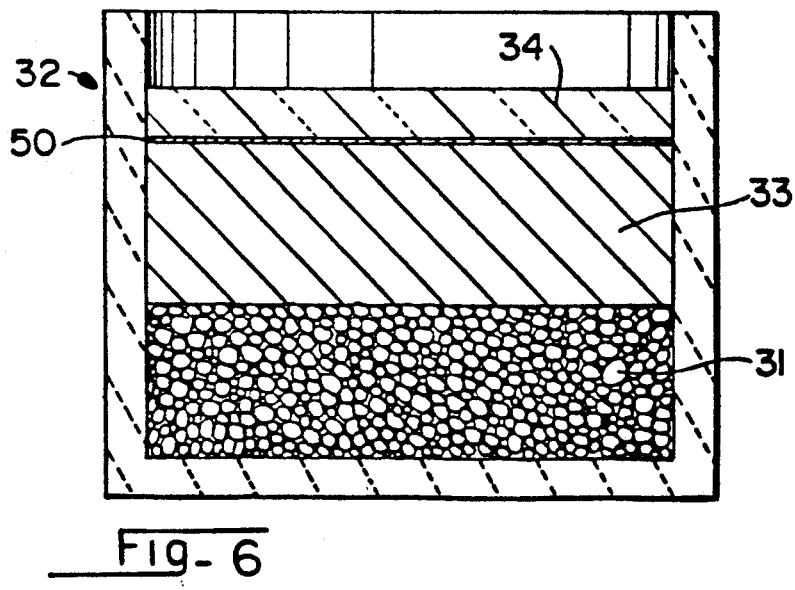
FIG. 6 is a schematic cross-sectional view of the lay-up used to make Sample U.

The experimental lay-up used for Sample U was slightly different from all previous experimental lay-ups discussed above herein. Similar to Sample P, the entire lay-up was constructed at room temperature and was placed into an electric resistance heated furnace at room temperature. Specifically, as shown in FIG. 6, a dense, sintered alumina crucible 32 about 1.5 inches (38 mm) high and having an inner diameter of about 1 inch (25 mm), from Bolt Ceramics of Conroe, Tex., was used as the impermeable container. A silicon carbide filler material 31 known as 39 CRYSTOLON® and having a grit size of 54, was mixed with about 25 weight percent −325 mesh copper powder (from Consolidated Astronautics) and the mixture was poured into the container 32 to a depth of about ½ inch (13 mm). Copper chop 33 from alloy C 811 (i.e., a substantially pure copper wire which had been chopped into a plurality of pieces) was placed on top of the filler material 31 to a depth of about ½ inch. A GRAFOIL® graphite tape 50 was then placed on top of the copper chop 33 so as to substantially cover the copper chop 33. A sealing means mixture 34 of about 50 weight percent $B_2O_3$ powder, from the Aesar Company, and about 50 weight percent 220 grit $Al_2O_3$, known as 38 ALUNDUM® from the Norton Co., was placed on top of the graphite tape 50 so as to completely cover the graphite tape 50. The lay-up shown in FIG. 6 was placed into a resistance heated air atmosphere furnace and heated from room temperature to about 1250° C. in about 6½ hours, during which time the sealing means mixture 34 melted, degassed and formed a seal on the molten copper matrix metal 33, and was held at about 1250° C. for about 3 hours. The lay-up was removed from the furnace and was permitted to cool.

Figure 7A:
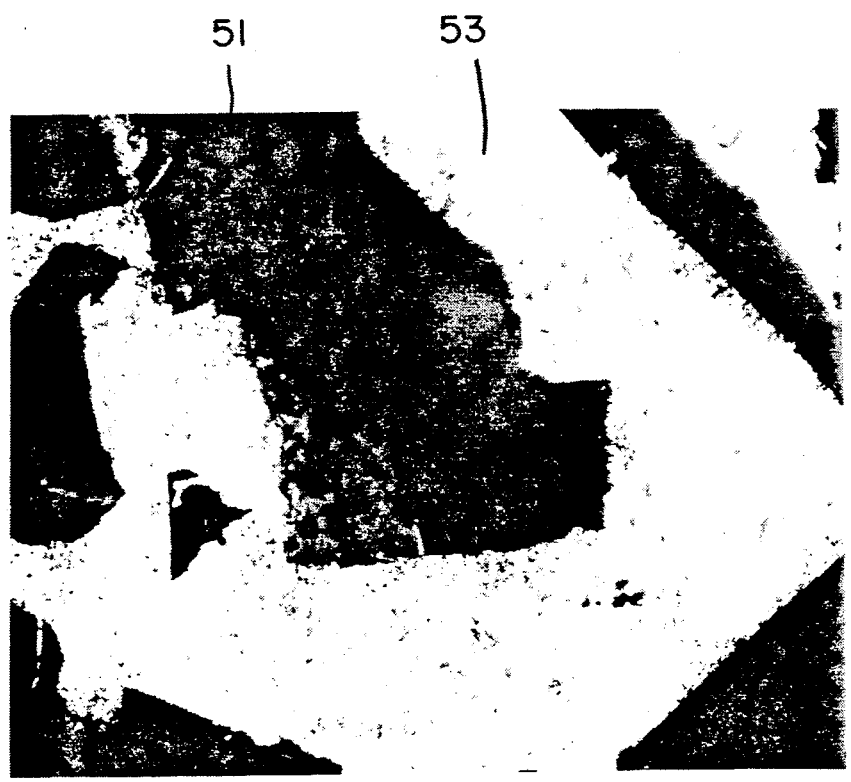
FIGS. 7A-E shows a series of photomicrographs corresponding to Samples made according to Example 3.
Figure 7B:
Figure 7C:
Figure 7D:
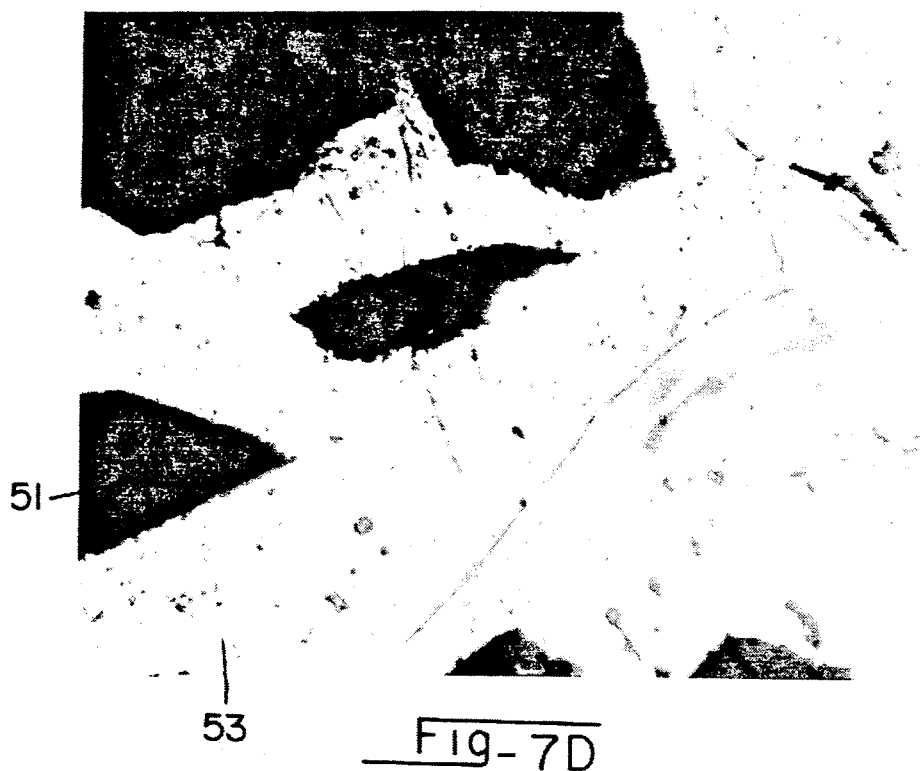
Figure 7E:
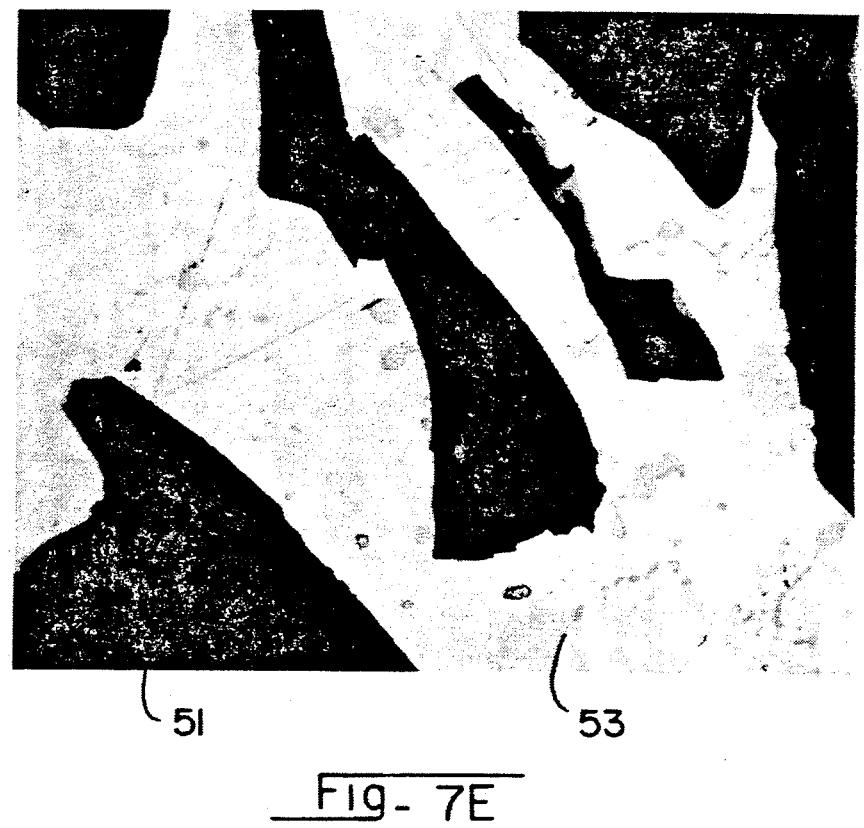

Each of Samples I-U formed desirable metal matrix composite bodies. Some properties of these Samples are reported in Table 2. Moreover, micrographs taken at about 400× are shown for some of the Samples in FIG. 7. Specifically, FIG. 7A shows a micrograph corresponding to Sample I; FIG. 7B shows a micrograph corresponding to Sample K; FIG. 7C shows a micrograph corresponding to Sample L; FIG. 7D shows a micrograph corresponding to Sample M; and FIG. 7E shows a micrograph corresponding to Sample N.

TABLE 2

| SAMPLE ID | MATRIX METAL | FILLER | CONTAINER MATERIAL | PROCESSING TEMPERATIRE |
|---|---|---|---|---|
| I* | 5052 | 90 grit $Al_2O_3$+ | Type 304 SS | 900° C. |
| J | 1100 | 90 grit $Al_2O_3$+ | Type 304 SS | 900° C. |
| K | 6061 | 90 grit $Al_2O_3$+ | Type 304 SS | 900° C. |
| L | 170.1 | 90 grit $Al_2O_3$+ | Type 304 SS | 900° C. |
| M | Aluminum alloy[1] | 90 grit $Al_2O_3$+ | Type 304 SS | 900° C. |
| N | 93% Cu 6% Si-% Fe | 90 grit $Al_2O_3$+ | Type 304 SS | 1100° C. |
| O | 93% Cu-6% Si-0.5% Fe-0.5% Al | 90 grit $Al_2O_3$+ | Type 304 SS | 1100° C. |
| P | ASTM A-48 Grade 30, 35 Gray Cast Iron* | 90 grit $Al_2O_3$+ | Sintered $Al_2O_3$# | 1400° C. |
| Q | 50% Al-50% Cu | 54 grit SiC++ | Type 304 SS | 900° C. |
| R | 75% Cu-25% Al | 54 grit SiC++ | Type 304 SS | 1100° C. |
| S | 90% Cu-5% Si-2% Fe-2% Zn-1% Al | 54 grit SiC++ | Type 304 SS | 1125° C. |
| T | 90% Cu-5% Si-2% Fe-3% Zn | 90 grit SiC++ | Type 304 SS | 1100° C. |
| U | C 811 (copper chop) | 54 grit SiC++ | Sintered $Al_2O_3$# | 1250° C. |

| SAMPLE ID | PROCESSING TIME (HOURS) | DENSITY g/cm$^3$ | COEFFICENT OF THERMAL EXPANSION ($\times 10^{-5}$/°C.) | FIG. NO. |
|---|---|---|---|---|
| I* | 2.25 | 3.30 | — | 7A |
| J | 2.25 | — | — | — |
| K | 2.25 | 3.44 | 12.7 | 7B |
| L | 2.25 | 3.39 | 12.3 | 7C |
| M | 2.25 | 3.58 | 12.7 | 7D |
| N | 2.25 | 5.92 | 11.2 | 7E |
| O | 2 | — | — | |
| P | 4 | 5.68 | — | |
| Q | 1.5 | — | — | |
| R | 1.5 | — | — | |
| S | 2 | — | — | |
| T | 2 | — | — | |
| U | 3 | — | — | |

+ 38 Alunlum ®, Norton Co., Worcester, MA
++ 39 Crystolon ®, Norton Co., Worcester, MA
Bolt Ceramics, Conroe, TX
* Kelly Foundry, Elkins, WV
[1] (7.5-9.5% Si, 3.0-4.0% Cu, <2.9% Zn, 2.2-2.3% Mg, <1.5% Fe, <0.5% Mn, <0.5% Ni, <0.35% Sn and the balance Al)

EXAMPLE 6

This Example demonstrates that a self-generated vacuum technique can be used to form aluminum metal matrix composites over a range of temperatures. The lay-up used in this Example was substantially the same as that shown in FIG. 1A. Moreover, the method set forth in Example 1 was substantially repeated except that the matrix metal was an aluminum alloy having a nominal composition of about 7.5–9.5% Si, 3.0–4.0% Cu, <2.9% Zn, 2.2–2.3% Mg, <1.5% Fe, <0.5 Mn, <0.35 Sn, and the balance Al. As in Example 1, a 90 grit 38 ALUNDUM® $Al_2O_3$ material from Norton Co. was used as the filler material 31. The aluminum matrix metal 33 was poured into the room temperature containers 32 at three different temperatures. Specifically, the matrix metal 33 was at the three temperatures of 800° C., 900° C. and 1000° C. As in Example 1, fifteen minutes was allowed for the $B_2O_3$ powder to melt, degas and form the gas impermeable seal. Each of the three containers 32 was placed into an electric resistance heated air furnace which was operating at a temperature which substantially corresponded to the temperature at which the molten matrix metal 33 which was poured into the container 32 (i.e., 800° C., 900° C. and 1000° C., respectively). After an additional two hours, each of the lay-ups was removed from the furnace and placed on a water cooled copper chill plate to directionally solidify the matrix metal.

Figure 8A:
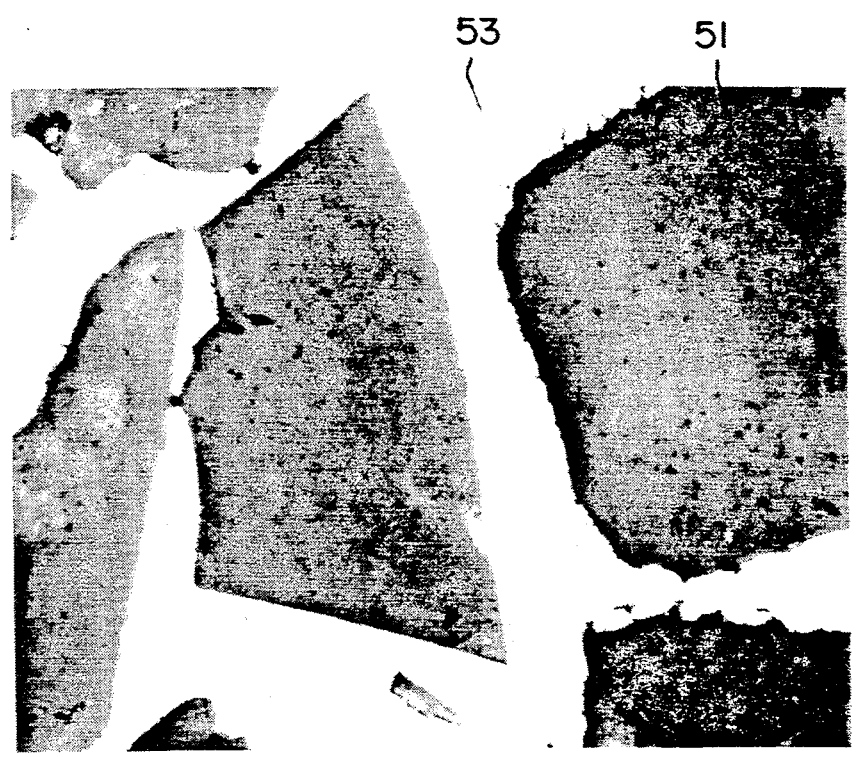
FIGS. 8A-C is a series of photomicrographs which correspond to Example 6.
Figure 8B:
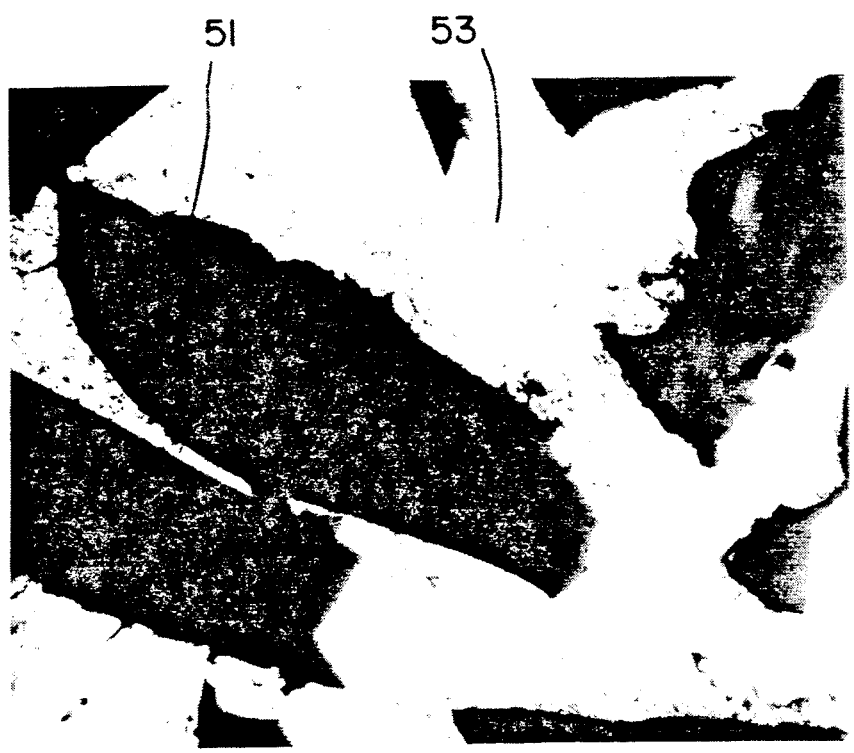
Figure 8C:

Once at room temperature, the three lay-ups were cross-sectioned to reveal that the matrix metal had infiltrated the filler material to form metal matrix composite bodies. Specifically, FIGS. 8A, 8B, and 8C are photomicrographs taken at 400× which correspond to the aluminum metal matrix composite bodies which were formed at 800° C., 900° C. and 1000° C., respectively. The numeral 51 represents the filler material and the numeral 53 represents the matrix metal.

EXAMPLE 7

This Example demonstrates that a self-generated vacuum technique can be used to form bronze metal matrix composites over a range of temperatures. The lay-up used in this Example was substantially the same as that shown in FIG. 1A. Moreover, the method set forth in Example 1 was substantially repeated except that the matrix metal was a copper alloy (i.e., a bronze alloy) having a composition of about 93% by weight Cu, about 6% by weight Si and about 1% by weight Fe. As in Example 1, a 90 grit 38 Alundum $Al_2O_3$ material from Norton Co. was used as the filler material 31. The bronze matrix metal 33 was poured into two room temperature containers 32 at two different temperatures. Specifically, the matrix metal 33 was at temperatures of 1050° C. and 1100° C. As in Example 1, fifteen minutes was allowed for the $B_2O_3$ powder to melt, degas and form the gas impermeable seal. Each of the two containers 32 was placed into an electric resistance heated air furnace which was operating at a temperature which substantially corresponded to the temperature at which the molten matrix metal 33 which was poured into the container 32. After an additional two hours, each of the lay-ups was removed from the furnace and placed on a water cooled copper plate to directionally solidify the matrix metal.

Figure 9A:
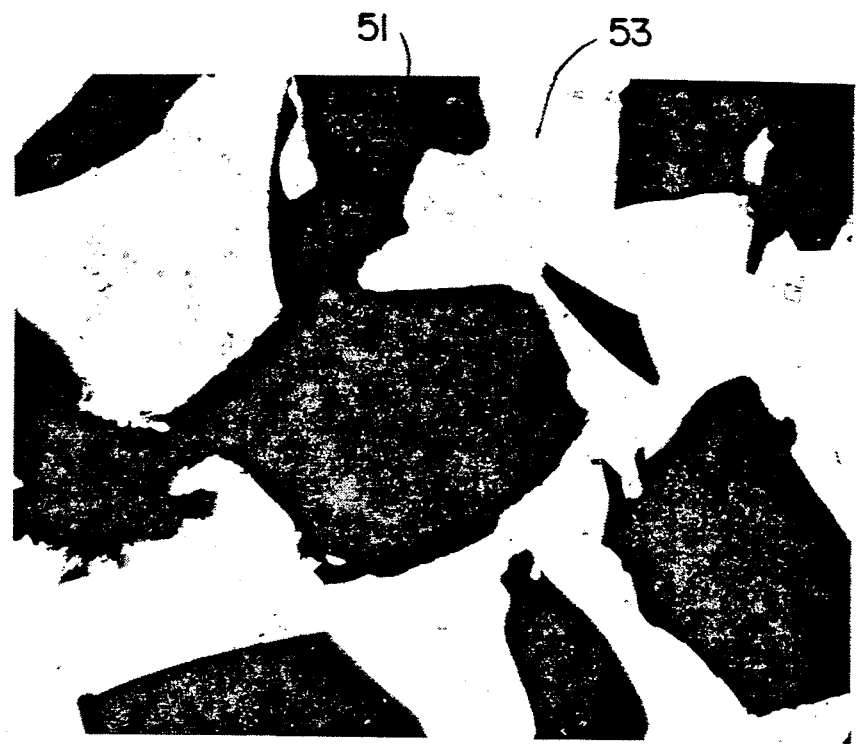
FIGS. 9A-B is a series of photomicrographs which correspond to Example 7.
Figure 9B:
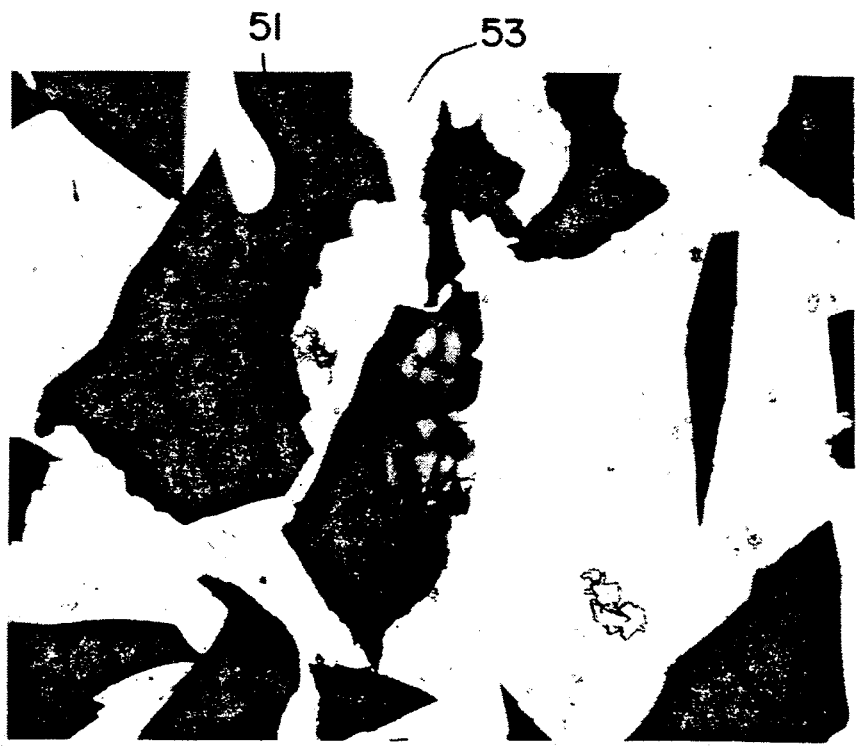

Once at room temperature, the lay-ups were cross-sectioned to reveal that the matrix metal had infiltrated the filler material to form metal matrix composite bodies. Specifically, FIGS. 9A and 9B are photomicrographs taken at 50× which correspond to the bronze metal matrix composite bodies which were formed at 1050° C. and 1100° C., respectively. The numeral 51 represents the filler material and the numeral 53 represents the matrix metal.

EXAMPLE 8

This Example demonstrates that a variety of filler materials may be infiltrated by an aluminum matrix metal using a self-generated vacuum technique. Specifically, a lay-up similar to that shown in FIG. 1A was used in Example 8. Moreover, the experimental procedures set forth in Example 1 were followed except that the aluminum matrix metal had a composition of 7.5–9.5% Si, 3.0–4.0% Cu, <2.9% Zn, 2.2–2.3% Mg, <1.5% Fe, <0.5 Mn, <0.35 Sn, and the balance Al. The composition and grit size of the filler material 33 used in this Example, as well as other relevant experimental parameters, are listed in Table 3.

Figure 10A:
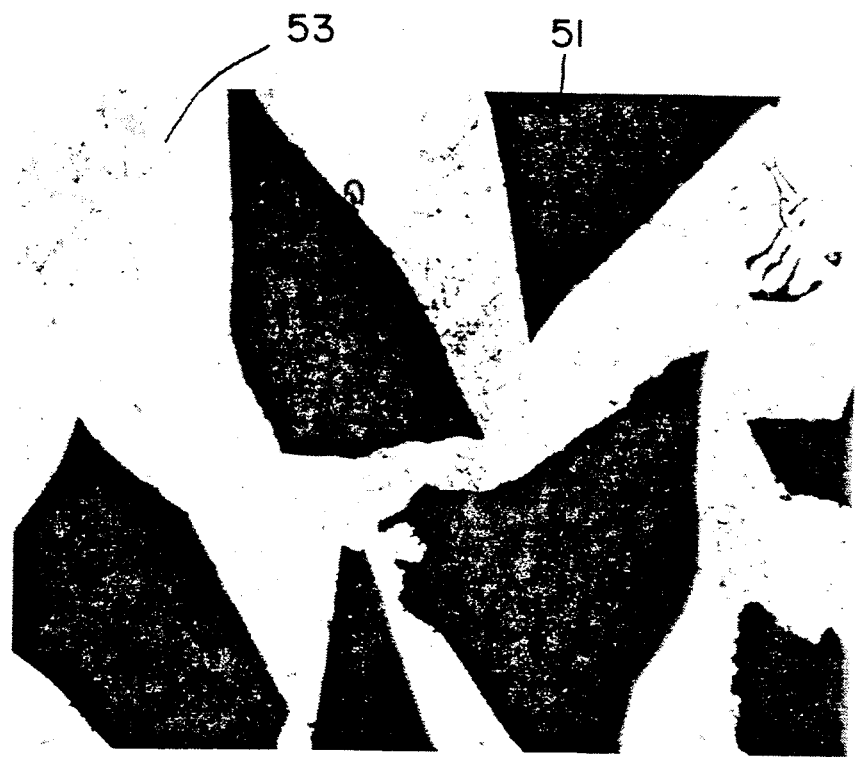
FIGS. 10A-F is a series of photomicrographs which correspond to Example 8.
Figure 10B:
Figure 10C:
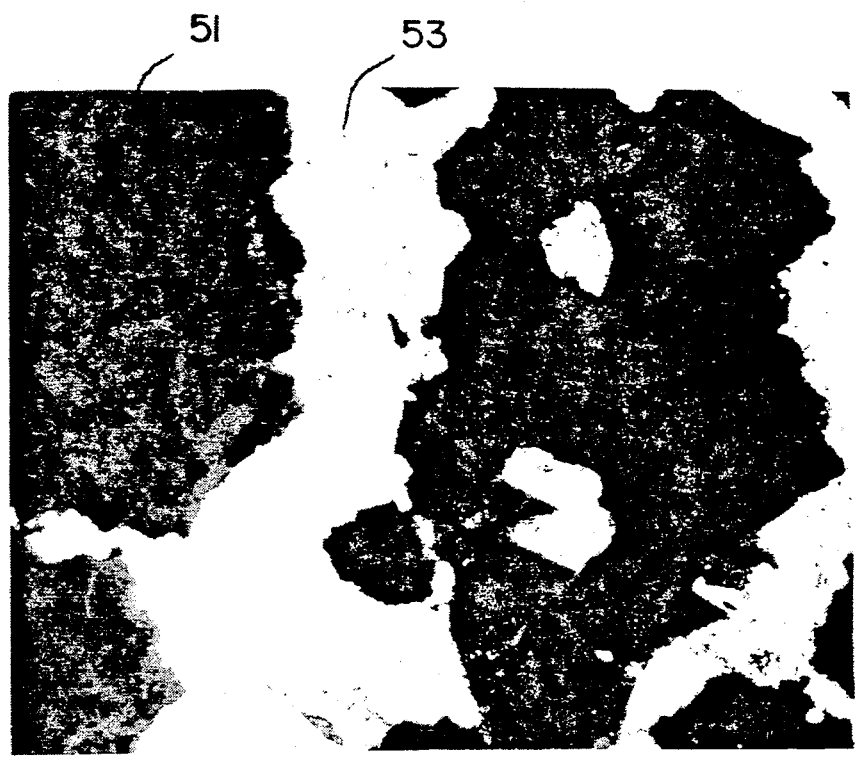
Figure 10D:
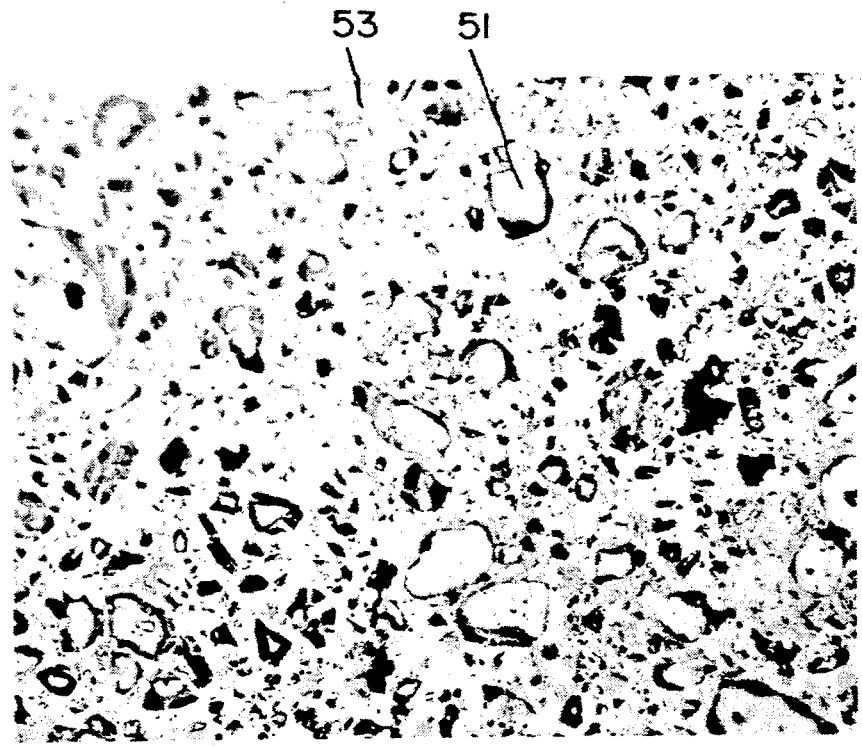
Figure 10E:
Figure 10F:
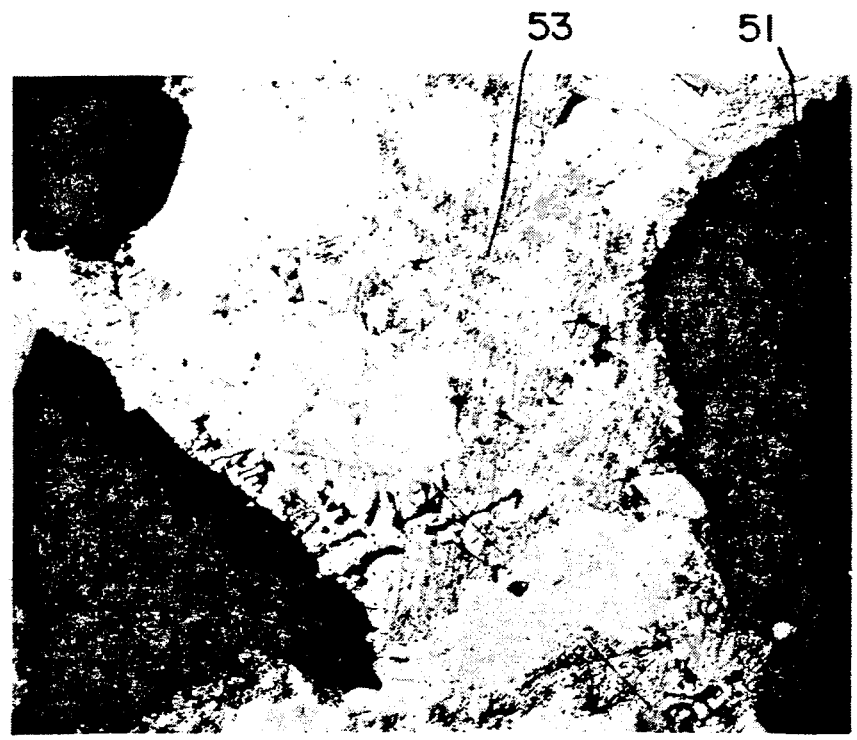

Once each of the lay-ups 30 were cooled to room temperature, they were cross-sectioned to determine whether a metal matrix composite had formed. All the Samples V–AB of this Example were observed to form aluminum metal matrix composites. Specifically, FIG. 10A is a photomicrograph taken at 400× which corresponds to Sample V; FIGS. 10B–10E are photomicrographs taken at 400× which correspond to Samples X–AA, respectively; and FIG. 10F is a photomicrograph taken at 50× which corresponds to Sample AB. The numeral 51 represents the filler material and the numeral 53 represents the matrix metal.

TABLE 3

| ID NO. | MATRIX METAL | FILLER | CONTAINER MATERIAL | TEMPERATURE |
|---|---|---|---|---|
| V | Aluminum alloy[1] | 90 grit $Al_2O_3$+ | Type 304 SS | 900° C. |
| W | " | 90 grit SiC+ | Type 304 SS | 900° C. |
| X | " | 90 grit $Al_2O_3$+++ | Type 304 SS | 900° C. |
| Y | " | 90 grit ZrO—$Al_2O_3$** | Type 304 SS | 900° C. |
| Z | " | −100 grit TiN# | Type 304 SS | 900° C. |
| AA | " | 100 grit $B_4C$@ | Type 304 SS | 900° C. |
| AB | " | T-64 Tabular $Al_2O_3$* (−24, +48 grit) | Type 304 SS | 900° C. |

| ID NO. | PROCESSING TIME (HOURS) | DENSITY g/cm$^3$ | COEFFICIENT OF THERMAL EXPANSION (× 10$^{-6}$/°C.) | FIG. NO. |
|---|---|---|---|---|
| V | 2.25 | 3.58 | 12.7 | 10A |
| W | 2.25 | 3.38 | 8.5 | — |
| X | 2.25 | 2.91 | 9.2 | 10B |
| Y | 2.25 | 3.48 | 12.6 | 10C |

TABLE 3-continued

| | | | | |
|---|---|---|---|---|
| Z | 2.25 | 3.56 | 10.9 | 10D |
| AA | 2.25 | 2.67 | 11.4 | 10E |
| AB | 2.25 | 3.47 | 10.0 | 10F |

\*\*MCA 1360, Norton Co., Worcester, MA
+++El Alundum ®, Norton Co., Worcester, MA
++39 Crystolon ®, Norton Co., Worcester, MA
+38 Alundum ®, Norton Co., Worcester, MA
Atlantic Equipment Engineers, Bergenfield, NJ
\*Alcoa, Pittsburgh, PA
@ESK Engineered Ceramics, Wacker Chemical, New Conaan, CT
1(7.5–9.5% Si, 3.0–4.0% Cu, <2.9% Zn, 2.2–2.3% Mg, <1.5% Fe, <0.5% Mn, <0.5% Ni, <0.35% Sn and the balance Al)

EXAMPLE 9

This Example demonstrates that a variety of filler materials may be infiltrated by a bronze matrix metal using a self-generated vacuum technique. Specifically, a lay-up similar to that shown in FIG. 1A was used in the Example. Moreover, the experimental procedures set forth in Example 1 were followed except that the bronze matrix metal comprised about 93 weight percent Cu, 6 weight percent Si and 1 weight percent Fe. The temperature of the molten matrix metal and the furnace was about 1100° C. The composition and grit size of the filler material 31 used in this Example, as well as other relevant experimental parameters, are listed in Table 4.

Figure 11A:
FIGS. 11A-E is a series of photomicrographs which correspond to Example 9.
Figure 11B:
Figure 11C:
Figure 11D:
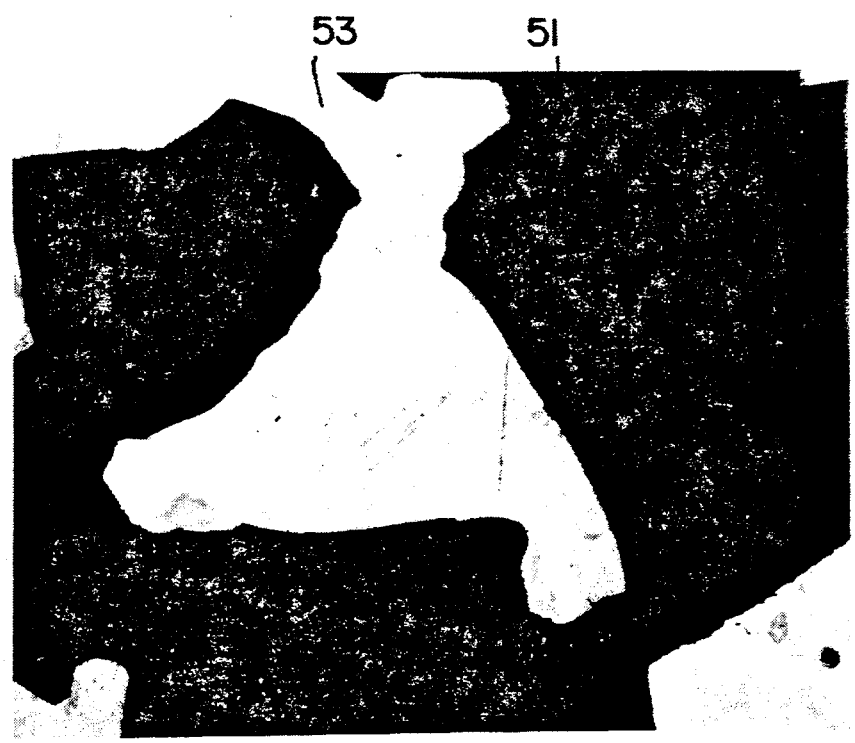
Figure 11E:
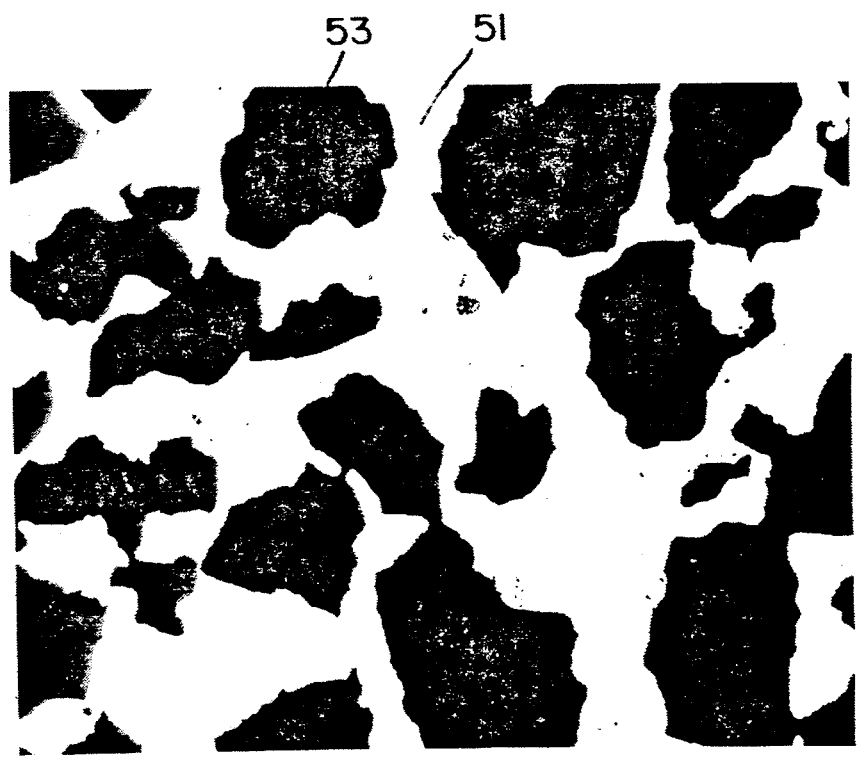

Once each of the lay-ups 30 were cooled to room temperature, they were cross-sectioned to determine whether the matrix metal had infiltrated the filler materials 33 to form corresponding metal matrix composite bodies. All of Samples AC–AI in this Example formed metal matrix composite bodies. Specifically, FIGS. 11A–11D are photomicrographs taken at 400×, which correspond to Samples AC–AF, respectively; whereas FIGS. 11E is a photomicrograph taken at 50×, which corresponds to Sample AG. The numeral 51 represents the filler material and the numeral 53 represents the matrix metal.

self-generated vacuum technique of the present invention. Moreover, the same apparatus can be used to create a specific controlled atmosphere within an impermeable container. Thus, the self-generated vacuum can be observed as a function of atmosphere.

Still further, this Example demonstrates quantitatively the importance of using an extrinsic physical sealing means under the process conditions discussed in the Example.

The vacuum measuring apparatus was made by first constructing an impermeable container from 16 gauge (1.6 mm thick) AISI Type 304 stainless steel. Specifically, the stainless steel container was similar to the container discussed in Example 1. However, the container was fitted with an ⅛" (3 mm) OD and a 1/16" (1.6 mm) ID stainless steel tube which was "L-shaped" and about 21" (533 mm) in total length. Specifically, FIG. 12A shows a vacuum measuring apparatus 60 which comprises a stainless steel container 32 having a stainless steel tube 61 extending through and welded to a side wall 64 of the container 32. The portion of the tube 61 which extends into the container 32 measured about 3½ inches (89 mm), whereas the height of the tube was about 17½ inches (445 mm). It should be understood that the dimensions of the tube 61 are not critical, however, the tube should be of an appropriate size and shape to

TABLE 4

| ID NO. | MATRIX METAL | FILLER | CONTAINER MATERIAL |
|---|---|---|---|
| AC | 93% Cu-6% Si-1% Fe | 90 grit Al₂O₃+ | Type 304 SS |
| AD | 93% Cu-6% Si-1% Fe | 90 grit SiC+ | Type 304 SS |
| AE | 93% Cu-6% Si-1% Fe | 90 grit ZrO₂—Al₂O₃\*\* | Type 304 SS |
| AF | 93% Cu-6% Si-1% Fe | 90 grit Al₂O₃+++ | Type 304 SS |
| AG | 93% Cu-6% Si-1% Fe | T-64 Tabular Al₂O₃\* (−24, +48 grit) | Type 304 SS |
| AH | 93% Cu-6% Si-1% Fe | −80, +100 grit ZrO₂# | Type 304 SS |
| AI | 90% Cu-5% Si-2% Fe-3% Zn | 0.14 inch diameter Al₂O₃ hollow spheres## | Type 304 SS |

| ID. NO. | PROCESSING TIME | DENSITY g/cm³ | ELASTIC MODULUS GPa | COEFFICIENT OF THERMAL EXPANSION | FIG. NO. |
|---|---|---|---|---|---|
| AC | 2.25 h | 5.92 | 11.2 | 154 | 11A |
| AD | 2.25 h | 5.01 | 9.0 | 124 | 11B |
| AE | 2.25 h | — | — | — | 11C |
| AF | 2.25 h | 5.66 | 10.5 | 146 | 11D |
| AG | 2.25 h | 5.52 | 11.8 | 128 | 11E |
| AH | 2.25 h | — | — | — | — |
| AI | 2 h | 3.9 | — | — | — |

\*\*MCA 1360
+38 Alundum ®, Norton Co., Worcester, MA
++39 Crystolon ®, Norton Co., Worcester, MA
+++El Alundum ®, Norton Co., Worcester, MA
Muscle Shoals Minerals, Tuscombia, AL
\*Alcoa, Pittsburgh, PA
@ESK Engineered Ceramics, Wacker Chemical, New Conaan, CT
Ceramic Fillers, Inc., Atlanta, GA

EXAMPLE 10

This Example discloses a method and an apparatus for measuring the amount of vacuum generated by the permit one end of the tube 61 to be located within the container 32 and the other end of the tube 61 to be located outside of the furnace. The vacuum gauge 63 was a commercially available vacuum gauge that would not be capable of withstanding the metal matrix composite formation temperatures. Thus, the tube 61 extended out of the furnace and was removably attached to the vacuum gauge 63 by a screw thread 62 which was welded to the end of the tube 61. FIG. 12A also shows that the lay-up used was similar to the lay-up discussed in Example 1 except that the bottom of the container 32 contained a layer of loosely packed 500 grit $Al_2O_3$ (38 ALUNDUM®) 65 which was used to cover the stainless steel tubing 61. This powder 65 permitted the tubing 61 to communicate with the inner chamber of the container 32 throughout the infiltration process, because under the specific conditions of this procedure, the matrix metal could not infiltrate the powder 65. A 90 grit alumina material (38 ALUNDUM® from Norton Co.) was placed on top of the powder 65 to a depth of about 1½" (38 mm). A molten aluminum matrix metal 33, at a temperature of about 900° C., was then poured into the room temperature container 32. The aluminum metal was a commercially available 170.1 alloy, which was a commercially pure aluminum. A layer of powdered $B_2O_3$ was then placed onto the surface of the molten metal 33 and the entire assembly 60 was placed into an electric resistance heated furnace which was operating at a temperature of about 900° C. (Note, however, that the vacuum gauge 63 was located externally to the furnace.).

An experimental lay-up similar to that shown in FIG. 12A was then placed into the same furnace as the above-discussed lay-up. The second lay-up was exactly the same as the first lay-up except that no sealing layer 34 (e.g., was used in the comparative lay-up. Thus, this Example permitted a quantitative comparison to be made between two lay-ups, with the only difference between the lay-ups being the use of a sealing means 34 in one lay-up.

Figure 13:
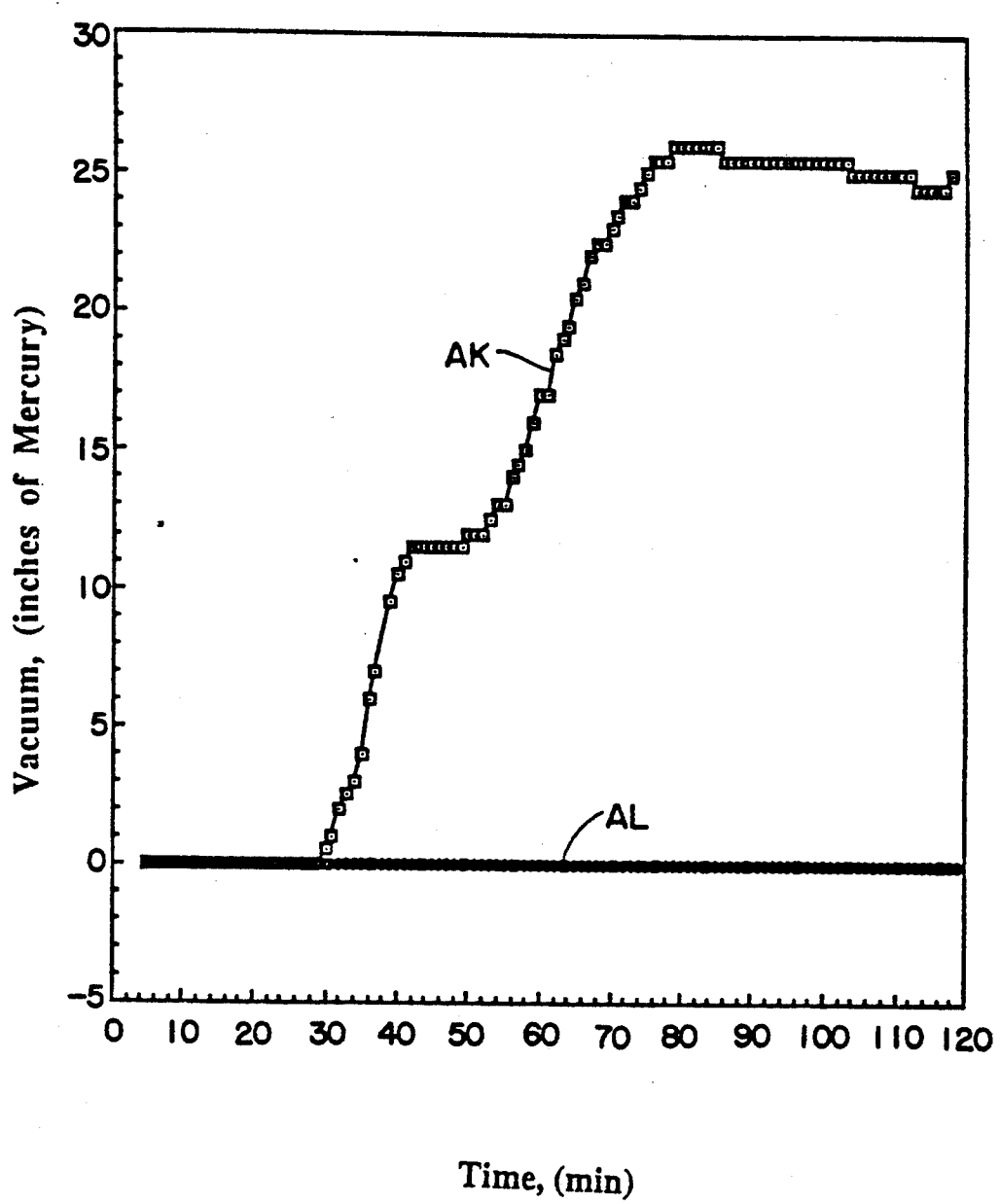
FIG. 13 is a plot of the amount of vacuum as a function of time according to Sample AK and Sample AL.

Specifically, the vacuum generated within each container 32 was monitored as a function of time. FIG. 13 shows a plot of the vacuum in inches of mercury as a function of time for each of the two lay-ups. Specifically, plot AK corresponds to the lay-up which used a sealing layer 34 (Sample AK) and plot AL corresponds to the comparative lay-up (Sample AL) which did not use a sealing layer 34. It is clear from FIG. 13 that no vacuum was generated in the comparative lay-up, whereas a vacuum of about 26 inches (660 mm) of mercury was generated from the lay-up which used a sealing layer 34.

Figure 14A:
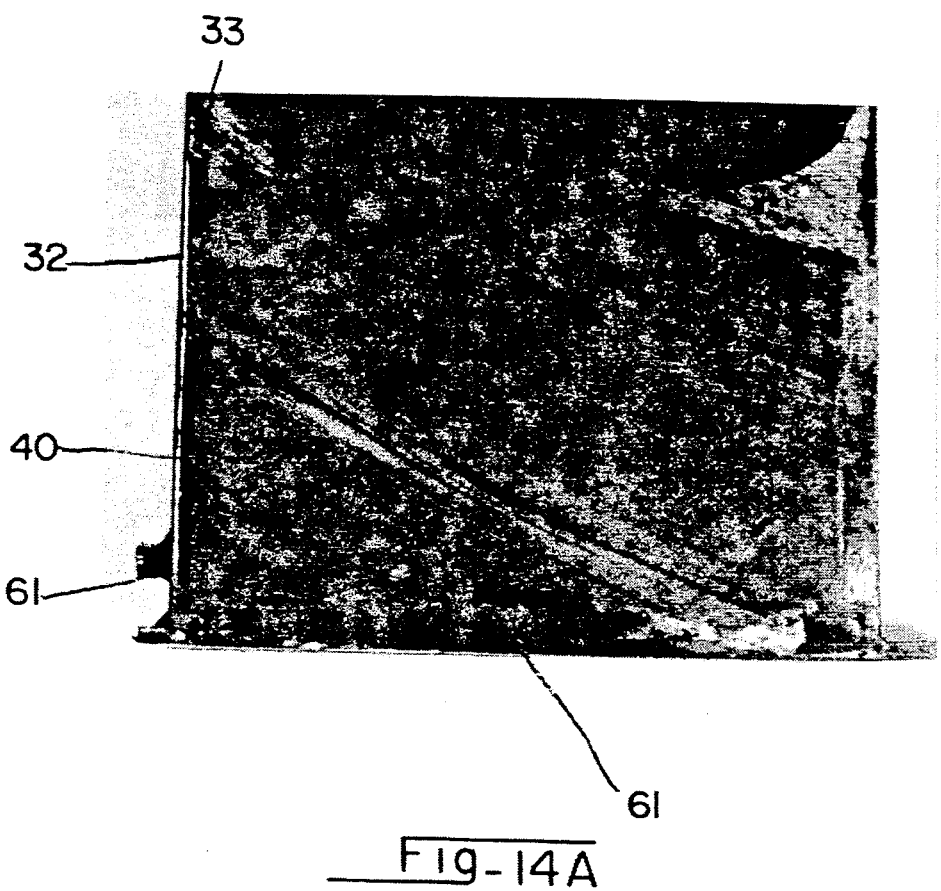
FIG. 14A and 14B correspond to products produced according to Samples AK and AL, respectively.
Figure 14B:
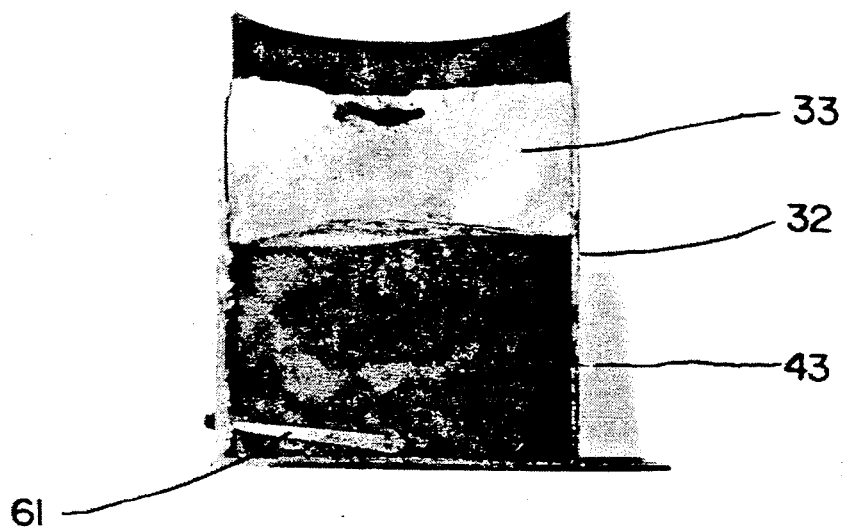

After about two hours at about 900° C., each of the containers 32, which corresponded to Samples AK and AL, were removed from the furnace and were directionally solidified by use of a water cooled copper chill plate. The samples were then cross-sectioned and photographed. FIG. 14A, which corresponds to Sample AK, shows that a metal matrix composite body 40 was formed. The only place where a metal matrix composite body was not formed corresponds to where the 500 grit powder 65 was positioned. Moreover, the end of the tube 61, which was positioned within the 500 grit powder 65, can be clearly seen. FIG. 14B, which corresponds to sample AL, shows that no infiltration occurred. Specifically, only the cavity 43, the matrix metal 33 and the tube 61 remained after Sample AL was cross-sectioned (i.e., all of the filler material 31 fell out of the container 32 during the cross-sectioning thereof).

EXAMPLE 11

This Example demonstrates that an atmosphere other than air may be used in conjunction with an aluminum matrix metal. The apparatus 66, shown in FIG. 12B, is similar to the apparatus 60 shown in FIG. 12A. However, the tube 61 communicates with a nitrogen gas source 67, rather than a vacuum gauge 63. A nitrogen atmosphere was introduced into the filler material 31 by flowing nitrogen through the tube 61 at a rate of about 180 cc/minute. Specifically, the molten 170.1 alloy discussed in Example 10 was poured onto the filler material 31 discussed in Example 10. Nitrogen was introduced into the bottom of the container 32, during which time the molten aluminum matrix metal 33 solidified, and nitrogen continued to flow for a predetermined time thereafter (i.e., nitrogen was flowed for a total of about 1 hour after the molten aluminum 33 was poured onto the filler material 31). After about 1 total hour of nitrogen flow, the nitrogen source 67 was disconnected from the tube 61 and was replaced immediately with a vacuum gauge 63. Immediately thereafter, a molten $B_2O_3$ layer was poured onto the surface of the solidified matrix metal 33. Thus, the lay-up 66 had been modified to be substantially the same as the lay-up 60 shown in FIG. 12A except for the $N_2$ atmosphere surrounding the filler material. The lay-up was then placed into a resistance heated air atmosphere box furnace which had been preheated to about 900° C. The lay-up was maintained in the furnace for about two hours, during which time the vacuum gauge was monitored.

The maximum vacuum achieved during the two hour period was about 12 inches (305 mm) of mercury.

The lay-up was removed from the furnace after about two hours and was placed on a water cooled copper chill plate to directionally solidify the matrix metal. Once cooled to room temperature, the lay-up was cross-sectioned to reveal that the matrix metal had infiltrated the filler material to form a metal matrix composite.

EXAMPLE 12

The procedures of Example 11 were repeated, except that the composition of the matrix metal was changed from a 170.1 alloy to an alloy which had the following composition: 7.5–9.5% Si, 3.0–4.0% Cu, <2.9% Zn, 2.2–2.3% Mg, <1.5% Fe, <0.5% Ni and <0.35% Sn and the remainder Al. A metal matrix composite body was successfully formed.

EXAMPLE 13

The procedures of Example 11 were followed except that oxygen was substituted for nitrogen. The maximum vacuum that was achieved during the two hours at 900° C. was about 10 inches (254 mm) of mercury. After the two hour isothermal hold, the lay-up was removed from the furnace and placed onto a water cooled copper chill plate to directionally solidify the matrix metal.

Once at room temperature, the lay-up was cross-sectioned to reveal that the matrix metal had infiltrated the filler material to form a metal matrix composite body.

EXAMPLE 14

The procedures set forth in Example 11 were followed except that the matrix metal was a bronze matrix metal and the operating temperature of the furnace was about 1100° C. The matrix metal had a specific composition of about 6% by weight Si, 1% by weight Fe and a remainder Cu.

Figure 15:
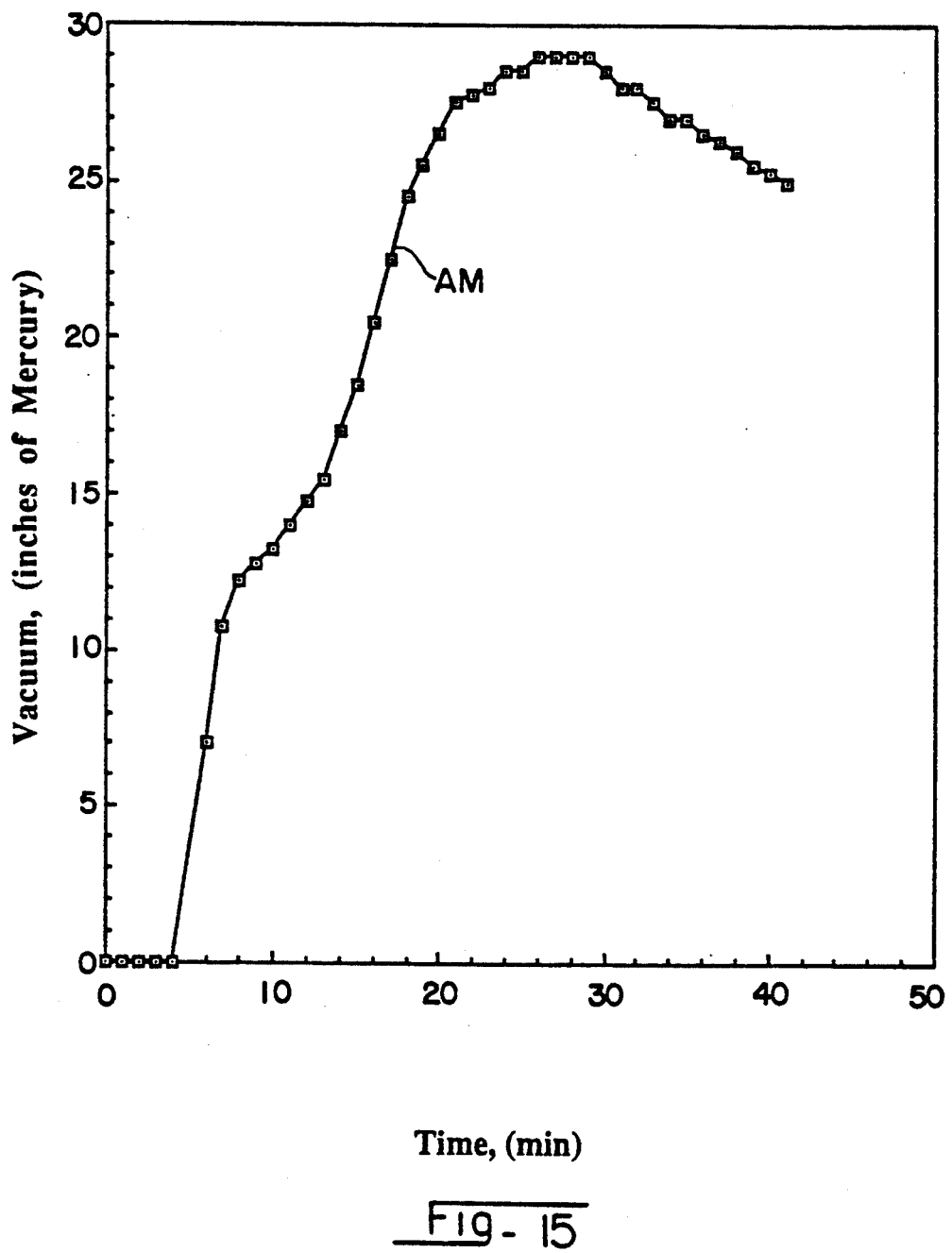
FIG. 15 is a plot of the amount of vacuum versus time for Example 14.

FIG. 15 shows a plot AM, corresponding to the Sample AM made according to this Example, which shows that a maximum vacuum of about 29 inches (737 mm) of mercury was achieved. After about two hours at about 1100° C., the lay-up was removed from the furnace and placed on the water cooled copper chill plate to directionally solidify the matrix metal.

Once at room temperature, the lay-up was cross-sectioned to reveal that the matrix metal had infiltrated the filler material to form a metal matrix composite body.

EXAMPLE 15

This Example demonstrates that a variety of materials may be used as the extrinsic seal forming material in the present invention. The experimental lay-up was the same as that used in FIG. 1A and the experimental procedure was the same as that set forth in Example 1. The only differences were that the matrix metal was a bronze alloy comprising about 93% by weight Cu 6% by weight Si and 1% by weight Fe, the temperature of the furnace and alloy were about 1100° C. and different seal forming materials were used. Specifically, the three separate seal forming materials included $B_2O_3$ from the Aesar Co. of Seabrook, N.H., (the same as the seal forming material 34 in Example 1), Glass V212, and Glass V514, both from Vitrifunctions, Greensburg, Pa. After about two hours at about 1100° C., the samples were removed from the furnace and placed on a water cooled copper chill plate to directionally solidify the matrix metal. Each of the these Examples successfully formed a metal matrix composite body.

Another Example of a seal forming material was performed. Specifically, the impermeable container 32 of Example 1 was filled with about 1 inch (25 mm) of a filler material mixture 31 comprising 54 grit (37 CRYSTOLON ® SiC) with about 20% by weight of 90 grit $Al_2O_3$ (38 ALUNDUM ®) added thereto. About 1 inch (25 mm) of molten matrix metal 33 consisting by weight of about 6% Si, about 1% Fe and the balance copper was poured into the container 32. Pieces of broken common bottle glass were sprinkled onto the surface of the molten matrix metal 33. The lay-up, comprising the stainless steel container 32 and its contents, was placed into a resistance heated air atmosphere box furnace set at about 1100° C. After about 3 to 4 hours at about 1100° C., the setup was removed from the furnace and cooled. At room temperature, the setup was disassembled to reveal a formed metal matrix composite body.

EXAMPLE 16

The lay-up shown in FIG. 1B and the steps set forth in Example 2 were substantially repeated for two additional Samples. Specifically, no $B_2O_3$ was added to either lay-up. The only difference in the experimental procedure was that one Sample was held in the furnace for about two hours (just as in Example 2); whereas the other Sample was held in the furnace for about three hours. After two and three hours had elapsed, respectively, each lay-up was removed from the furnace and placed onto a water cooled copper chill plate to directionally solidify the matrix metal. Once at room temperature, the lay-ups were cross-sectioned to determine whether a metal matrix composite had formed. It was observed that the container held at temperature for 3 hours had formed a metal matrix composite, whereas the container held at temperature for two hours did not form a metal matrix composite. It was also observed that a slag-like material had formed in the container held at temperature for 3 hours. The slag-like material comprised $Cu_2O$ and was located along the perimeter of the interface between the matrix metal 33 and the container 32. It is possible that a constituent from the matrix metal reacted with the ambient atmosphere to assist in the formation of a gas impermeable seal.

EXAMPLE 17

This Example demonstrates the use of seal facilitator to assist in the formation of an intrinsic physical and/or chemical seal. Specifically, two identical lay-ups similar to the lay-up shown in FIG. 1B were made, except one container 32 was provided with an alloy that contained a seal facilitator, whereas the other alloy had none. Both alloys 33 were not covered with $B_2O_3$ or any extrinsic seal forming material. The composition of the filler, the amount of filler material and the stainless steel containers were identical to those used in Example 1. One container 32 was filled with approximately 575 grams of a molten matrix metal 33 comprising a commercially available aluminum alloy designated 170.1. The second container 32 was filled with approximately 575 grams of a molten matrix metal 33 comprising 7.5-9.5% Si, 3.0-4.0% Cu, <2.9% Zn, 2.2-2.3% Mg, <1.5% Fe, <0.5% Ni, <0.35% Sn and the remainder aluminum. The two lay-ups comprising the stainless steel containers 32 and their contents were placed into an air atmosphere box furnace which was preheated to a temperature of about 900° C. About 15 minutes were allowed for the lay-ups to come to temperature. The lay-ups were maintained at temperature for about an additional two hours. Then, both lay-ups were removed from the furnace and placed on a water cooled copper chill plate to directionally solidify the matrix metal.

Once at room temperature, the two lay-ups were cross-sectioned to determine whether the matrix metal(s) 33 had infiltrated the filler material 31 to form metal matrix composite bodies. It was observed that the container having the 170.1 alloy had not formed a metal matrix composite body, whereas the container with the (7.5-9.5% Si, 3.0-4.0% Cu, <2.9% Zn, 2.2-2.3% Mg, <1.5% Fe, <0.5% Ni, <0.35% Sn and the remainder Al) had formed a metal matrix composite. It was also observed that this second alloy had formed a skin at a point where the matrix metal 33 contacted the stainless steel container 32. This skin was analyzed by x-ray diffraction and was shown to be predominantly a magnesium aluminate spinel. Thus, this Example illustrates that a seal facilitator alone (e.g., without the use of any extrinsic seal) can form conditions favorable for a matrix metal to infiltrate a filler material to form a metal matrix composite body.

EXAMPLE 18

This Example demonstrates the use of wetting enhancers to assist in the formation of metal matrix composite bodies utilizing the self-generated vacuum technique. Table 5 summarizes the matrix metals, filler materials, temperatures, processing times and the amount of wetting enhancer used for various experiments performed according to this Example.

TABLE 5

| SAMPLE ID | MATRIX METAL | FILLER | WETTING ENHANCER | TEMPERATURE | PROCESSING TIME (HOURS) | METAL MATRIX COMPOSITE FORME |
|---|---|---|---|---|---|---|
| AN | 93% Cu-6% Si-0.5% Fe-0.5% Al | 220 grit SiC++ | None | 1100° C. | 2 | No |
| AO | 93% Cu-6% Si-0.5% Fe-0.5% Al | 220 grit SiC++ | 2% by weight −325 mesh Se[2] | 1100° C. | 2.25 | Yes |
| AP | 93% Cu-6% Si-0.5% Fe-0.5% Al | 220 grit SiC++ | 3% by weight −325 mesh Se[2] | 1100° C. | 2.25 | Yes |
| AQ | 93% Cu-6% Si-0.5% Fe-0.5% Al | 180 grit $Al_2O_3$+++ | 1% by weight −325 mesh Se[2] | 1100° C. | 2 | Yes |
| AR | 93% Cu-6% Si-0.5% Fe-0.5% Al | 220 grit $Al_2O_3$+++ | 1% by weight −325 mesh Se[2] | 1100° C. | 2 | Yes |
| AS | 93% Cu-6% Si-0.5% Fe-0.5% Al | 180 grit $Al_2O_3$+++ | 1% by weight −325 mesh Se[2] | 1100° C. | 2 | Yes |
| AT | 93% Cu-6% Si-0.5% Fe-0.5% Al | 180 grit $Al_2O_3$+++ | 1% by weight −325 mesh Se[2] | 1125° C. | 2.25 | Yes |
| AU | 90% Cu-5% Si-2% Fe-3% Zn | 220 grit $Al_2O_3$+++ | 10% by weight −325 mesh Sn[1] | 1100° C. | 5 | Yes |

+38 Alundum ®, Norton Co., Worcester, MA
++39 Crystolon ®, Norton Co., Worcester, MA*
+++El Alundum ®, Norton Co., Worcester, MA
[1]Atlantic Equipment Engineers, Bergenfield, NJ
[2]Aesar of Johnson Matthey, Seabrook, NH

SAMPLE AN

A lay-up similar to that shown in FIG. 1A was made by forming an impermeable container 32 constructed from about 16 gauge (1.6 mm thick) AISI Type 304 stainless steel and having an inner diameter of about 1.6 inches (41 mm) and a height of about 2.5 inches (64 mm). The container 32 was filled with a filler material 31 comprising 220 grit SiC (39 Crystolon from the Norton Co.). About 1 inch (25 mm) of a molten matrix metal 33 comprising by weight about 6% silicon, about 0.5% Fe, about 0.5% Al, and the balance copper, was poured into the room temperature container 32. About 20 grams of $B_2O_3$ powder from the Aesar Co. of Johnson Matthey, Seabrook, N.H., was poured onto the surface of the molten matrix 33 to create a gas impermeable seal. The lay-up comprising the stainless steel container 32 and its contents, was placed into a resistance heated air atmosphere box furnace preheated to a temperature of about 1100° C. After about 2.25 hours at temperature, the stainless steel container 32 and its contents were removed from the furnace and placed on a sand bed to permit the matrix metal to solidify. Once at room temperature, the lay-up was disassembled, and it was observed that the matrix metal had not infiltrated the filler material and therefore had not formed a metal matrix composite body.

SAMPLES AO-AT

The experimental procedures set forth above in reference to Sample AN, were followed for each of these Samples, except that varying amounts of Se (selenium) was added to the filler material 31 by a standard mixing operation. The precise amounts of filler material, wetting enhancer, processing temperature and processing time are set forth in Table 5. Each of Examples AO-AT successfully formed metal matrix composite bodies.

SAMPLE AU

Figure 16:
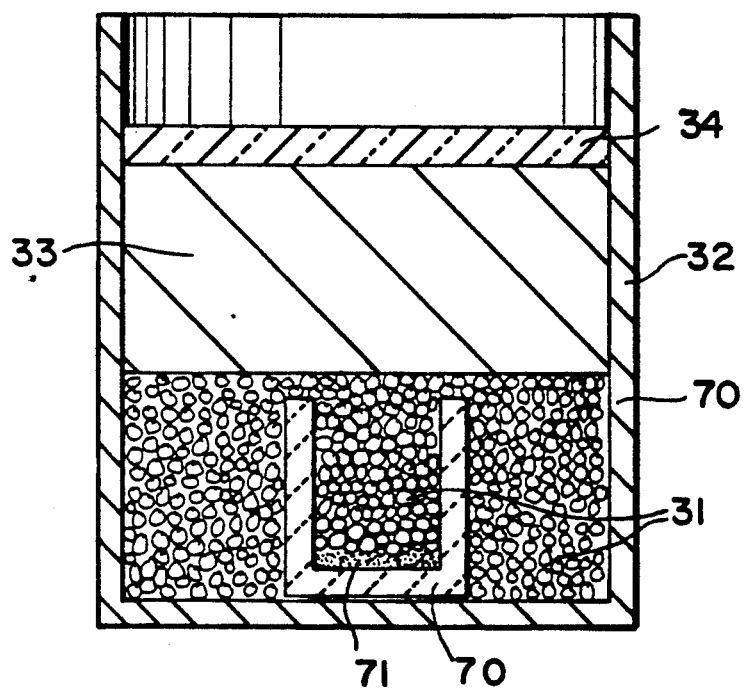
FIG. 16 is a cross-sectional view of a lay-up used according to Example 18, Sample AU.

The lay-up used for this Example differed slightly from all of the other lay-ups used in this Example. Specifically, an alumina crucible 70, as shown in FIG. 16, obtained from Bolt Technical Ceramics, Inc., Conroe, Tex., having about a 1 inch (25 mm) inner diameter and about a 1.4 inch (36 mm) height was cut to about a ½ inch (13 mm) height and was placed within the filler material 31. The bottom of the crucible was filled with a −325 mesh Sn powder 71 obtained from Atlantic Equipment Engineers, Bergenfield, N.J. The remaining unfilled portion of the alumina crucible 70 was filled with a filler material 31 comprising $Al_2O_3$ known as 38 ALUNDUM ® (from Norton Co.). The Sn in the crucible 70 comprised about 10% by weight of the total contents in the crucible. Additional filler material 31, having the same characteristics of the filler material within the crucible 70, was then placed around and on top of the crucible 70. About 1 inch (25 mm) of molten matrix metal 33 comprising by weight about 5% Si, about 2% Fe, about 3% Zn and the balance copper, was poured into the container 32. The molten matrix metal 33 was then covered with about 20 grams of $B_2O_3$ powder 34. The lay-up, comprising the stainless steel container 32 and its contents, was placed into a resistance heated air atmosphere box furnace set at about 1100° C. After about 5 hours at a temperature of about 1100° C., the lay-up was removed from the furnace and cooled.

Once at room temperature, the lay-up was cut open and it was observed that the matrix metal had infiltrated the 220 grit 38 ALUNDUM ® within the alumina crucible 70. However, the 220 grit 38 ALUNDUM ® that the space between the alumina crucible and the stainless steel container (and which was not in contact with the Sn powder) had not formed a metal matrix composite body. Thus, the Sn powder, similar to the Se powder, functioned as a wetting enhancer for the bronze matrix metal.

EXAMPLE 19

This Example demonstrates that a range of filler material sizes and compositions can be incorporated into aluminum metal matrix composite bodies made by the self-generated vacuum technique.

Experimental procedures were substantially the same as those set forth in Example 1, and a lay-up similar to that shown in FIG. 1A was used. Table 6 summarizes which matrix metals, filler materials, temperatures and processing times were used for the various Samples produced according to this Example. Each of Samples AV-AZ successfully formed metal matrix composite bodies.

EXAMPLE 20

This Example demonstrates that a range of filler material sizes and compositions can be incorporated into bronze metal matrix composite bodies made by the self-generated vacuum technique.

TABLE 6

| SAMPLE ID | MATRIX METAL | FILLER | TEMPERATURE | PROCESSING TIME | METAL MATRIX COMPOSITE FORMED |
|---|---|---|---|---|---|
| AV | 170.1 | 220 grit $Al_2O_3$+ | 950° C. | 2.25 h | Yes |
| AX | 170.1 | 90 grit $Al_2O_3$+ | 950° C. | 2.25 h | Yes |
| AY | Aluminum alloy[1] | T-64 Tabular $Al_2O_3$* (−24, +48 mesh) | 900° C. | 2.25 h | Yes |
| AZ | Aluminum alloy[1] | 180 grit SiC++ | 800° C. | 3.5 h | Yes |

+38 Alundum ®, Norton Co., Worcester, MA
++39 Crystolon ®, Norton Co., Worcester, MA
*Alcoa, Pittsburgh, PA
[1](7.5-9.5% Si, 3.0-4.0% Cu, <2.9% Zn, 2.2-2.3% Mg, <1.5% Fe, <0.5% Mn, <0.35% Sn and the balance Al)

SAMPLES BA-BE

Experimental procedures were substantially the same as those set forth in Example 1, and a lay-up similar to that shown in FIG. 1A was used.

Table 7 summarizes which matrix metals, filler materials, temperatures and processing times were used for the various Samples produced according to this Example.

SAMPLE BF

This Sample was produced utilizing the same methods used to prepare Sample AP in Example 18.

TABLE 7

| SAMPLE ID | MATRIX METAL | FILLER | TEMPERATURE | PROCESSING TIME (HOURS) |
|---|---|---|---|---|
| BA | 90% Cu-5% Si-3% Zn-2% Fe | 14 grit and 90 grit SiC++ (50% 14 grit, 50% 90 grit) | 1100° C. | 2 |
| BB | 90% Cu-5% Si-3% Zn-2% Fe | T-64 Tabular $Al_2O_3$* (−24, +48 mesh) | 1100° C. | 3 |
| BC | 90% Cu-5% Si-3% Zn-2% Fe | 54 grit 39 SiC++ | 1125° C. | 2 |
| BD | 90% Cu-5% Si-3% Zn-2% Fe-1% Al | 90 grit+ | 1125° C. | 3 |
| BE | 90% Cu-5% Si-3% Zn-2% Fe | 180 grit SiC++ and 10% −325 mesh Sn[1] | 1100° C. | 4 |
| BF | 90% Cu-6% Si-0.5% Fe-0.5% Al | 220# SiC++ and 3% −325 mesh Se[2] (used as a wetting enhancer) | 1100° C. | 2.25 |

+38 Alundum ®, Norton Co., Worcester, MA
++39 Crystolon ®, Norton Co., Worcester, MA*
[1]Atlantic Equipment Engineers, Bergenfield, NJ
[2]Aesar of Johnson Matthey, Seabrook, NH

What is claimed is:

1. A method of making a metal matrix composite body comprising the steps of:
    forming a reaction system comprising at least: (1) an impermeable container, (2) a reactive atmosphere, and (3) a molten matrix metal;
    at least partially sealing the reaction system, the sealing occurring on at least a portion of a surface of the molten matrix metal within the impermeable container, said sealing comprising at least one glassy material on said at least a portion of a surface; and
    heating the at least partially sealed reaction system, thereby: (1) creating a self-generated vacuum within at least a portion of said sealed reaction system; (2) developing, for at least a portion of said at least partially sealing, a pressure differential between said reactive atmosphere within said at least partially sealed reaction system and an ambient atmosphere which is external to said sealed reaction system; and (3) forming a metal matrix composite body without the requirement for the application of any external pressure to achieve infiltration.

2. The method of claim 1, wherein said matrix metal comprises at least one of an aluminum matrix metal, a bronze matrix metal, a copper matrix metal, a cast iron matrix metal, and a magnesium matrix metal.

3. The method of claim 2, wherein said matrix metal comprises aluminum and a wetting enhancer comprising at least one material selected from the group consisting of magnesium, bismuth, lead and tin.

4. The method of claim 1, wherein said at least partially sealing comprises substantially completely isolating said reactive atmosphere from said ambient atmosphere.

5. The method of claim 1, further comprising providing at least one wetting enhancer or at least one seal facilitator to said reaction system.

6. The method of claim 5, wherein said at least one wetting enhancer comprises an alloy constituent of said matrix metal.

7. The method of claim 1, wherein said at least partially sealing further comprises a reaction product of said matrix metal and said ambient atmosphere or a reaction product of said matrix metal and said impermeable container.

8. The method of claim 1, wherein the reaction system further comprises a preform of filler material or a loose mass of filler material, wherein said filler material comprises at least one material selected from the group consisting of powders, flakes, platelets, microspheres, whiskers, bubbles, fibers, particulates, fiber mats, chopped fibers, spheres, pellets, tubules and refractory cloths.

9. The method of claim 1, wherein the reaction system further comprises a preform of filler material or a loose mass of filler material, wherein said filler material comprises at least one material selected from the group consisting of oxides, carbides and nitrides.

10. The method of claim 1, wherein said impermeable container comprises at least one material selected form the group consisting of a ceramic, a metal, a glass and a polymer.

11. The method of claim 10, wherein said impermeable container comprises alumina, silicon carbide, clay or stainless steel.

12. The method of claim 1, wherein said reactive atmosphere comprises at least one material selected from the group consisting of an oxygen-containing atmosphere and a nitrogen-containing atmosphere.

13. The method of claim 1, wherein the reaction system further comprises a permeable mass comprising a preform of filler material or a loose filler material and said heating of the at least partially sealed reaction system is to a temperature greater than the melting point of said matrix metal, but less than the volatilization temperature of said matrix metal and the melting point of said permeable mass.

14. The method of claim 1, further comprising directionally solidifying the formed metal matrix composite body.

15. The method of claim 1, wherein said at least partially sealing comprises at least one material selected from the group consisting of boron glasses, silicon glasses and boron oxides, which is at least partially molten during at least a portion of said infiltrating.

16. The method of claim 1, wherein said matrix metal comprises aluminum and further comprising a preform of filler material or a loose mass of filler material, wherein said filler material comprises at least one material selected from the group consisting of oxides, carbides and nitrides.

17. The method of claim 16, wherein the temperature of said reaction system is about 700° C. to about 1000° C.

18. The method of claim 1, wherein said matrix metal comprises aluminum and said reactive atmosphere comprises at least one of air, oxygen and nitrogen.

19. A method of making a metal matrix composite body comprising the steps of:
providing an impermeable container;
at least partially filling said impermeable container with a permeable mass comprising a filler material or a preform of filler material;
at least partially permeating at least a portion of said permeable mass with a reactive atmosphere;
contacting a molten matrix metal with at least a portion of said permeable mass contained within said impermeable container;
at least partially sealing said molten matrix metal and said permeable mass to form an at least partially sealed reaction system, said sealing comprising at least one glassy material on at least a portion of a surface of said molten matrix metal within said impermeable container, said at least partial sealing at least partially separating said reactive atmosphere from am ambient atmosphere which is external to said sealed reaction system;
maintaining said molten matrix metal in contact with said permeable mass for a time sufficient to at least partially infiltrate said permeable mass with said molten matrix metal without the requirement for the application of any external pressure to achieve infiltration, said at least partial infiltration occurring by creating a self-generated vacuum within at least a portion of said at least partially sealing, a pressure differential between said reactive atmosphere within said at least partially sealed reaction system and said ambient atmosphere; and
solidifying at least a portion of said molten matrix metal that has infiltrated said permeable mass, thereby forming a metal matrix composite.

20. The method of claim 19, wherein said matrix metal comprises at least one material selected from the group consisting of aluminum, magnesium, bronze, copper and cast iron.

21. The method of claim 19, further comprising providing at least one wetting enhancer or at least one seal facilitator to said reaction system.

22. The method of claim 19, wherein said filler material or said preform of filler material comprises at least one material selected from the group consisting of oxides, carbides and nitrides.

23. The method of claim 19, wherein said matrix metal comprises a material selected from the group consisting of aluminum, copper and bronze and said impermeable container comprises stainless steel.

24. The method of claim 19, wherein said reactive atmosphere comprises at least one material selected from the group consisting of an oxygen-containing atmosphere and a nitrogen-containing atmosphere.

25. The method of claim 19, wherein id matrix metal comprises aluminum and said reactive atmosphere comprises air, oxygen or nitrogen.

26. The method of claim 25, wherein the temperature of said reaction system is about 700° C. to about 1000° C.

27. The method of claim 19, wherein said matrix metal comprises at least one of a bronze matrix metal, a copper matrix metal and a cast iron matrix metal and the reactive atmosphere comprises air, oxygen or nitrogen.

28. The method of claim 19, wherein the temperature of said reaction system is greater than the melting point of said matrix metal, but less than the volatilization temperature of said matrix metal and the melting point of said permeable mass.

29. The method of claim 19, wherein said matrix metal comprises bronze or copper and said filler material comprises at least one material selected from the group consisting of oxides, carbides and nitrides.

30. The method of claim 29, wherein the temperature of said reaction system is about 1050° C. to about 1125° C.

31. The method of claim 19, wherein said matrix metal comprises cast iron and said filler material comprises at least one material selected from the group consisting of oxides, carbides and nitrides.

32. The method of claim 31, wherein the temperature of said reaction system is about 1250° C. to about 1400° C.

33. The method of claim 19, further comprising directionally solidifying the formed metal matrix composite body.

34. The method of claim 19, wherein said at least partially sealing comprises at least one material selected from the group consisting of boron glasses, silicon glasses, and boron oxides, which is at least partially molten during at least a portion of said infiltrating.

35. A method of making a metal matrix composite body comprising the steps of:
forming a reaction system comprising: (1) a matrix metal, (2) a reactive atmosphere, (3) an impermeable container, and (4) a permeable mass comprising at least one material selected from the group consisting of a filler material and a preform of filler material;

at least partially sealing the reaction system from an ambient atmosphere which is external to said at least partially sealed reaction system so as to achieve, for at least a portion of said at least partially sealing, a pressure differential between said reactive atmosphere within said at least partially sealed reaction system and said ambient atmosphere, the at least partially sealing comprising at least one glassy material and occurring on at least a portion of a surface of the matrix metal when the matrix metal is molten and within at least a portion of the impermeable container; and at least partially infiltrating, without the requirement for the application of any external pressure to achieve infiltration, said permeable mass with said molten matrix metal, thereby forming a metal matrix composite by creating a self-generated vacuum within at least a portion of said at least partially sealed reaction system.

36. The method of claim 35, wherein said pressure differential exists during at least a portion of said infiltrating of molten matrix metal into said permeable mass.

37. The method of claim 35, wherein said reactive atmosphere reacts at least partially with at least one of said matrix metal, said filler material and said impermeable container, thereby resulting in said pressure differential.

38. The method of claim 35, wherein said at least partially sealing further comprises a wetting of the impermeable container by the matrix metal or a reaction product of said matrix metal and said impermeable container.

39. The method of claim 35, wherein said matrix metal comprises at least one of a bronze matrix metal, a copper matrix metal and a cast iron matrix metal and the reactive atmosphere comprises air, oxygen or nitrogen.

40. The method of claim 35, wherein said matrix metal comprises aluminum and said filler material comprises at least one material selected from the group consisting of oxides, carbides and nitrides.

41. The method of claim 40, wherein the temperature of said reaction system is about 700° C. to about 1000° C.

42. The method of claim 35, wherein said matrix metal comprises bronze or copper and said filler material comprises at least one material selected from the group consisting of oxides, carbides and nitrides.

43. The method of claim 40, wherein the temperature of said reaction system is about 1050° C. to about 1125° C.

44. The method of claim 35, wherein said matrix metal comprises cast iron and said filler material comprises at least one material selected from the group consisting of oxides, carbides and nitrides.

45. The method of claim 44, wherein the temperature of said reaction system is about 1250° C. to about 1400° C.

46. The method of claim 35, wherein said at least partially sealing comprises at least one material selected from the group consisting of boron glasses, silicon glasses and boron oxides, which is at least partially molten during at least a portion of said infiltrating.

47. A method of making a metal matrix composite body comprising the steps of:
providing an impermeable container;
at least partially filling said impermeable container with a permeable mass comprising a filler material or a preform of filler material;
providing at least a portion of said permeable mass with a reactive atmosphere;
at least partially contacting a molten matrix metal with said permeable mass contained within said impermeable container;
at least partially sealing said molten matrix metal and said permeable mass to form an at least partially sealed reaction system, said at least partially sealing separating said reactive atmosphere from an ambient atmosphere which is external to said sealed reaction system, said at least partially sealing comprising boron oxide and occurring on at least a portion of a surface of the molten matrix metal within the impermeable container;
maintaining said molten matrix metal in contact with said permeable mass for a time sufficient to at least partially infiltrate said permeable mass with said molten matrix metal by creating a self-generated vacuum within at least a portion of said at least partially sealed reaction system to develop, for at least a portion of said at least partially sealing, a pressure differential between said reactive atmosphere within said at least partially sealed reaction system and said ambient atmosphere; and
solidifying at least a portion of said molten matrix metal that has infiltrated said permeable mass, thereby forming a metal matrix composite.

48. The method of claim 47, wherein said matrix metal comprises at least one material selected from the group consisting of aluminum, magnesium, bronze, copper and cast iron.

49. The method of claim 48, wherein said filler material comprises at least one material selected from the group consisting of alumina, silicon carbide, zirconia, titanium nitride, boron carbide and mixtures thereof.

50. The method of claim 48, further comprising providing at least one wetting enhancer or at least one seal facilitator to said reaction system.

51. The method of claim 50, wherein said at least one wetting enhancer is alloyed with said matrix metal.

52. The method of claim 50, wherein said matrix metal comprises aluminum and said wetting enhancer comprises at least one material selected from the group consisting of magnesium, bismuth, lead and tin.

53. The method of claim 50, wherein said matrix metal comprises at least one of bronze and copper and said wetting enhancer comprises at least one material selected from the group consisting of selenium, tellurium and sulfur.

54. The method of claim 47, wherein said filler material comprises at least one material selected from the group consisting of powders, flakes, platelets, microspheres, whiskers, bubbles, fibers, particulates, fiber mats, chopped fibers, spheres, pellets, tubules and refractory cloths.

55. The method of claim 47, wherein said filler material comprises at least one material selected from the group consisting of oxides, carbides and nitrides.

56. The method of claim 47, wherein said impermeable container comprises at least one material selected from the group consisting of a ceramic, a metal, a glass and a polymer.

57. The method of claim 56, wherein said impermeable container comprises alumina or silicon carbide.

58. The method of claim 47, wherein said matrix metal comprises a material selected from the group consisting of aluminum, copper and bronze and said impermeable container comprises stainless steel.

59. The method of claim 47, wherein said matrix metal comprises bronze or copper and said filler comprises at least one material selected from the group consisting of oxides, carbides and nitrides.

60. The method of claim 59, wherein the temperature of said reaction system is about 1050° C. to about 1125° C.

61. The method of claim 47, wherein said matrix metal comprises cast iron and said filler comprises at least one material selected from the group consisting of oxides, carbides and nitrides.

62. The method of claim 61, wherein the temperature of said reaction system is about 1250° C. to about 1400° C.

* * * * *